(12) United States Patent
Yang

(10) Patent No.: US 7,764,516 B2
(45) Date of Patent: *Jul. 27, 2010

(54) METHOD AND APPARATUS OF PROVIDING SYNCHRONOUS REGULATION CIRCUIT FOR OFFLINE POWER CONVERTER

(75) Inventor: Ta-Yung Yang, Milpitas, CA (US)

(73) Assignee: System General Corporation, Shin-Dian, Taipei (TW)

( * ) Notice: Subject to any disclaimer, the term of this patent is extended or adjusted under 35 U.S.C. 154(b) by 167 days.

This patent is subject to a terminal disclaimer.

(21) Appl. No.: 12/034,671

(22) Filed: Feb. 21, 2008

(65) Prior Publication Data

US 2009/0213623 A1    Aug. 27, 2009

(51) Int. Cl.
*H02M 3/335* (2006.01)
*H02M 7/217* (2006.01)
(52) U.S. Cl. .................... 363/21.06; 363/127
(58) Field of Classification Search ............. 363/20, 363/21.04, 21.06, 21.07, 21.14, 21.15, 81, 363/84, 127
See application file for complete search history.

(56) References Cited

U.S. PATENT DOCUMENTS

| | | | |
|---|---|---|---|
| 4,855,888 | A | 8/1989 | Henze et al. |
| 5,442,540 | A | 8/1995 | Hua et al. |
| 6,353,544 | B1 | 3/2002 | Lau |
| 6,744,649 | B1 | 6/2004 | Yang et al. |
| 7,173,835 | B1 | 2/2007 | Yang |
| 7,224,590 | B2 * | 5/2007 | Lin ............... 363/21.06 |
| 7,558,082 | B2 * | 7/2009 | Jitaru ............. 363/21.06 |

(Continued)

FOREIGN PATENT DOCUMENTS

CN    1783682    6/2006

(Continued)

OTHER PUBLICATIONS

English abstract of CN1845437.

(Continued)

*Primary Examiner*—Jessica Han
*Assistant Examiner*—Jeffrey Gblende
(74) *Attorney, Agent, or Firm*—Thomas, Kayden, Horstemeyer & Risley

(57) ABSTRACT

A synchronous regulation circuit is provided. A secondary-side switching circuit is coupled to the output of the power converter to generate a synchronous signal and a pulse signal in response to an oscillation signal and a feedback signal. An isolation device transfers the synchronous signal from the secondary side to the primary side of the power converter. A primary-side switching circuit receives the synchronous signal to generate a switching signal for soft switching a transformer. The pulse signal is utilized to control a synchronous switch for rectifying and regulating the power converter. The synchronous switch includes a power switch and a control circuit. The control circuit receives the pulse signal for turning on or off the power switch. The power switch is connected between the transformer and the output of the power converter. A flyback switch is operated as a synchronous rectifier to freewheel the inductor current of the power converter. The flyback switch is turned on in response to the off state of the power switch. The turn-on period of flyback switch is correlated to the turn-on period of the power switch.

30 Claims, 18 Drawing Sheets

U.S. PATENT DOCUMENTS

| | | | |
|---|---|---|---|
| 2007/0177410 A1* | 8/2007 | Nakamura et al. | 363/21.06 |
| 2008/0031027 A1* | 2/2008 | Phadke et al. | 363/89 |
| 2008/0266909 A1* | 10/2008 | Tabaian et al. | 363/21.06 |
| 2009/0109711 A1* | 4/2009 | Hsu | 363/21.14 |
| 2009/0141521 A1* | 6/2009 | Yang | 363/49 |

FOREIGN PATENT DOCUMENTS

| | | |
|---|---|---|
| CN | 1845437 | 10/2006 |
| CN | 101106333 | 1/2008 |

OTHER PUBLICATIONS

English abstract of CN1783682.

English abstract of CN101106333.

* cited by examiner

METHOD AND APPARATUS OF PROVIDING SYNCHRONOUS REGULATION CIRCUIT FOR OFFLINE POWER CONVERTER

BACKGROUND OF THE INVENTION

1. Field of the Invention

The invention relates to power converters, and more particularly to synchronous power converter of power converters.

2. Description of the Related Art

An offline power converter includes a power transformer to provide isolation from an AC line input to the output of the power converter for safety. In recent development, using soft switching topologies in the primary side of the transformer and applying the synchronous rectifier in the secondary side of the transformer are to reach a higher efficiency for power conversion. Among them, the full-bridge quasi-resonant ZVS techniques are described in "Constant frequency resonant power converter with zero voltage switching" by Christopher, P. Henze, et al, U.S. Pat. No. 4,855,888; "Soft-switching PWM converters" by Guichao C. Hua and Fred C. Lee, U.S. Pat. No. 5,442,540; "Zero switching power converter operable as asymmetrical full-bridge converter" by Yang, et al, U.S. Pat. No. 6,744,649. The drawback of foregoing power converters is low efficiency at light load. An insufficient circular power causes hard switching and results low efficiency. The purpose of using the synchronous rectifier at the secondary side is to reduce the power loss of rectifiers. The description of the synchronous rectifying can be found in a prior art of "Control circuit associated with saturable inductor operated as synchronous rectifier forward power converter" by Yang, U.S. Pat. No. 7,173,835. The disadvantage of this skill is extra devices such as saturable inductors and current-sense resistor cause additional power consumption. The object of the invention is to integrate the synchronous rectifying circuit with the regulation circuit to achieve higher efficiency. No further switching stage is needed. The primary-side switching circuit, the secondary-side synchronous rectifier and the regulation circuit achieve high efficiency power conversion from no load to full load.

BRIEF SUMMARY OF THE INVENTION

Synchronous regulation methods, synchronous regulation circuits and power converters are provided. An exemplary embodiment of a synchronous regulation circuit is developed to improve the efficiency of offline power converter. It includes a primary-side switching circuit, a secondary-side switching circuit, a synchronous switch and a flyback switch. The secondary-side switching circuit is coupled to the output of the power converter to generate a pulse signal and a synchronous signal in response to an oscillation signal and a feedback signal. The feedback signal is correlated to the output of the power converter. The synchronous signal is coupled from the secondary side of the power converter to the primary side of the power converter through an isolation device. The primary-side switching circuit generates a switching signal in response to the synchronous signal. The switching signal is coupled to switch a transformer. The pulse signal is generated for the rectifying and the regulating of the power converter. The synchronous switch includes a power switch and a control circuit. The power switch is connected between the secondary side of the transformer and the output of the power converter. The control circuit is operated to receive the pulse signal for switching the power switch. The pulse signal is coupled from the secondary-side switching circuit to the control circuit. The polarity of the pulse signal determines the states of the power switch. The flyback switch is connected to the power switch and the output of the power converter. The flyback switch is turned on in response to the off of the power switch. The turn-on period of flyback switch is programmable and is correlated to the turn-on period of the power switch.

A detailed description is given in the following embodiments with reference to the accompanying drawings.

BRIEF DESCRIPTION OF DRAWINGS

The accompanying drawings are included to provide a further understanding of the present invention, and are incorporated in and constitute a part of this specification. The drawings illustrate embodiments of the invention and, together with the description, serve to explain the principles of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
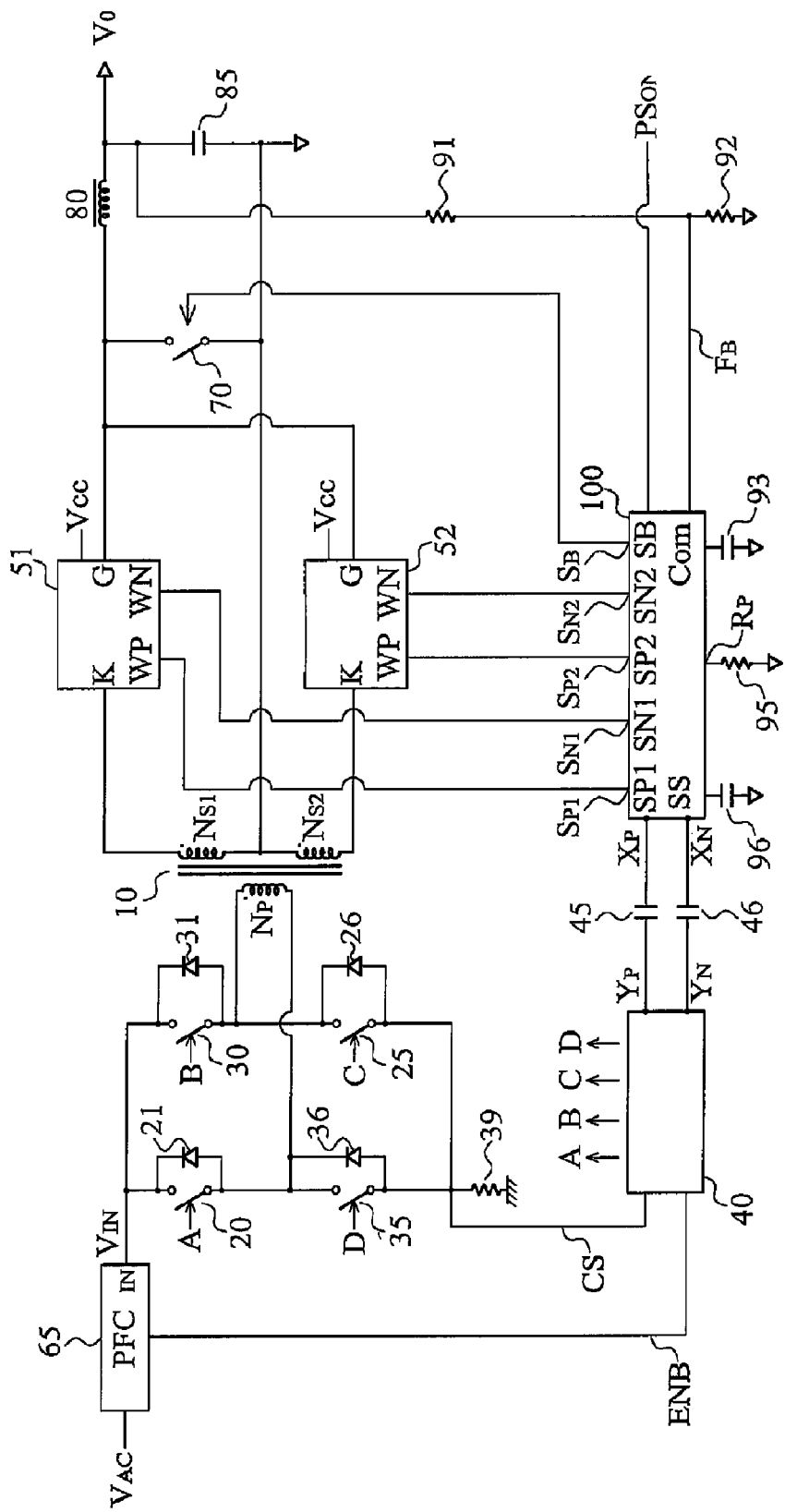
FIG. 1 is an embodiment of an offline power converter having a synchronous regulation circuit according to the invention.

FIG. 1 shows an offline power converter with synchronous regulation circuit according to an embodiment of the invention. The power converter includes a transformer 10 having a primary side and a secondary side. At the primary side, a primary winding $N_P$ of the transformer 10 is connected to four power switches 20, 25, 30, and 35 for switching the transformer 10. A primary-side switching circuit 40 generates switching signals A, B, C, and D in response to synchronous signals $Y_P$ and $Y_N$. Switching signals A, B, C, and D are coupled to switch the primary winding $N_P$ of the transformer 10. The primary-side switching circuit 40 further generates an enable signal ENB coupled to control the on and off state of a power factor correction (PFC) circuit 65 of the power converter. The enable signal ENB shows the output load condition of the power converter. The PFC circuit 65 is generally used for power factor correction of the power converter. Furthermore, a current-sense device 39 generates a current-sense signal CS in response to the switching current of the transformer 10. The current-sense signal CS is coupled to the primary-side switching circuit 40 to disable switching signals A, B once the current-sense signal CS is over an over-current threshold.

The secondary side of the transformer 10 includes a first secondary winding $N_{S1}$ and a second secondary winding $N_{S2}$. Switching voltages are produced across the secondary windings $N_{S1}$ and $N_{S2}$ in response to the switching of the transformer 10. A first synchronous switch 51 has a terminal K connected to the first secondary winding $N_{S1}$. The terminal G of the first synchronous switch 51 is connected to the output of the power converter. The terminal K of a second synchronous switch 52 is connected to the secondary winding $N_{S2}$. The terminal G of the second synchronous switch 52 is also connected to the output of the power converter. The synchronous switches 51 and 52 include a power switch and a control circuit. The power switch is coupled in between the terminal K and the terminal G. The control circuit is operated to receive pulse signals ($S_P$ and $S_N$ or $W_P$ and $W_N$) for turning on and off the power switch.

The first synchronous switch 51 is coupled to a secondary-side switching circuit 100 to receive pulse signals $S_{P1}$ and $S_{N1}$ from terminals SP1 and SN1 and transferred to the terminals WP and WN respectively. The second synchronous switch 52 is also coupled to the secondary-side switching circuit 100 for receiving pulse signals $S_{P2}$ and $S_{N2}$ from terminals SP2 and SN2. The secondary-side switching circuit 100 is coupled to the output of the power converter to generate synchronous signals $X_P$ and $X_N$ and pulse signals $S_{P1}$, $S_{N1}$, $S_{P2}$, and $S_{N2}$ in response to oscillation signals generated inside the secondary-side switching circuit 100 and a feedback signal $F_B$. The feedback signal $F_B$ is coupled to the output of the power converter via resistors 91 and 92. The feedback signal $F_B$ is thus correlated to the output voltage $V_O$ of the power converter. Synchronous signals $Y_P$ and $Y_N$ are generated via isolation devices, such as capacitors 45 and 46. Capacitors 45 and 46 are coupled to the secondary-side switching circuit 100 for transferring synchronous signals $X_P$ and $X_N$. Pulse signals $S_{P1}$, $S_{N1}$, $S_{P2}$, and $S_{N2}$ are generated for rectifying and regulating of the power converter. The polarity of the pulse signals $S_{P1}$, $S_{N1}$, $S_{P2}$, and $S_{N2}$ determines the on/off state of the power switch.

An inductor 80 is coupled to the first secondary winding $N_{S1}$ and the second secondary winding $N_{S2}$ to the output $V_O$ of the power converter. A flyback switch 70 is coupled to synchronous switches 51 and 52 through secondary windings $N_{S1}$ and $N_{S2}$, respectively. The flyback switch 70 is further connected to the ground of the output of the power converter to freewheel the switching current of the inductor 80. A terminal SB of the secondary-side switching circuit 100 generates a drive signal $S_B$ to control the flyback switch 70. The flyback switch 70 is turned on in response to the off state of the power switch. The turn-on period of flyback switch 70 is programmable and correlated to the turn-on time of the power switch. Furthermore, synchronous signals $X_P$ and $X_N$ and pulse signals $S_{P1}$, $S_{N1}$, $S_{P2}$, and $S_{N2}$ are generated in response to a power-on signal $PS_{ON}$. The power-on signal $PS_{ON}$ is utilized to control the on/off of the power converter. The enable signal ENB is also generated in response to the power-on signal $PS_{ON}$. A capacitor 93 is connected to the secondary-side switching circuit 100 for the loop compensation. A capacitor 96 is used for the soft start. A resistor 95 is applied to program the turn-on period of the flyback switch 70.

Figure 2:
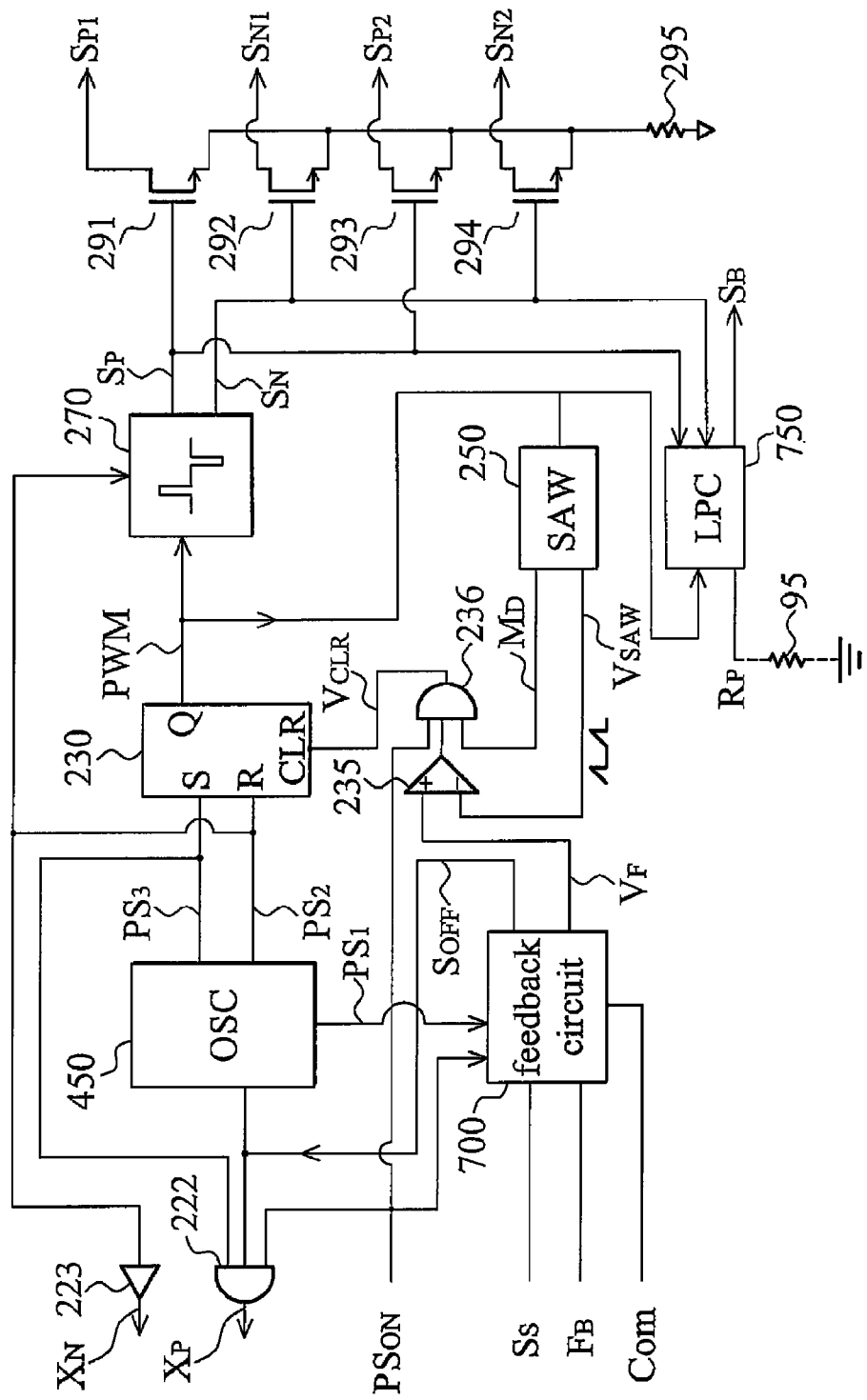
FIG. 2 is an embodiment of a secondary-side switching circuit according to the invention.

FIG. 2 is the circuit schematic of the secondary-side switching circuit 100. An oscillation circuit 450 generates oscillation signals $PS_1$, $PS_2$ and $PS_3$. Oscillation signals $PS_2$ and $PS_3$ are coupled to the input of a SR-flip-flop 230. The SR-flip-flop 230, an AND gate 236 and a comparator 235 develop a pulse width modulation (PWM) circuit for generating a pulse width modulation signal PWM at the output of the SR-flip-flop 230 in response to oscillation signals $PS_2$ and $PS_3$. The input terminal CLR of the SR-flip-flop 230 is controlled by an output of the AND gate 236. The input of the AND gate 236 is controlled by the comparator 235. A feedback circuit 700 including an error amplifier, a soft-start circuit, a protection circuit and a power management circuit. The feedback circuit 700 generates an off-control signal $S_{OFF}$ during the light load of the power converter for power saving. Furthermore, the off-control signal $S_{OFF}$ will be generated when the feedback of the power converter is open loop. The off-control signal $S_{OFF}$ is coupled to disable switching signals A, B (shown in FIG. 1) and turn off the power switch of synchronous switches 51, 52. The error amplifier and the soft-start circuit of the feedback circuit 700 generate an error signal $V_F$ in response to the feedback signal $F_B$ and a soft-start signal $S_S$. A ramp circuit 250 is designed to produce a ramp signal $V_{SAW}$ and a maximum-duty signal $M_D$ in response to the pulse width modulation signal PWM. The error signal $V_F$ and the ramp signal $V_{SAW}$ are connected to the comparator 235. The output of the comparator 235, the power-on signal $PS_{ON}$ and the maximum-duty signal $M_D$ are connected to the AND gate 236 to generate a clear signal $V_{CLR}$ for disabling the pulse width modulation signal (PWM).

A pulse signal generator 270 generates pulse signals $S_P$ and $S_N$ in accordance with the pulse width modulation signal PWM and the oscillation signal $PS_2$. Therefore, the pulse width modulation signal (PWM) is enabled in response to the oscillation signal $PS_3$. The pulse width modulation signal (PWM) is disabled in response to the oscillation signal $PS_2$ and the clear signal $V_{CLR}$. The soft-start signal $S_S$ is coupled to control the pulse width of the pulse width modulation signal (PWM). Pulse signals $S_P$ and $S_N$ are a differential signal. The polarity of pulse signals $S_P$ and $S_N$ is determined by the pulse width modulation signal (PWM). Pulse signals $S_P$ and $S_N$ are coupled to generate pulse signals $S_{P1}$ and $S_{N1}$ through transistors 291 and 292. Pulse signals $S_P$ and $S_N$ are further used to generate pulse signals $S_{P2}$ and $S_{N2}$ through transistors 293 and 294. The resistor 295 is applied to limit the current of transistors 291, 292 and 293, 294. Pulse signals $S_{P1}$, $S_{N1}$ and $S_{P2}$, $S_{N2}$ are differential signals. The polarity of the pulse signals $S_{P1}$, $S_{N1}$ and $S_{P2}$, $S_{N2}$ (active low) is opposite to the polarity of pulse signals $S_P$, $S_N$ (active high).

Synchronous signals $X_P$ and $X_N$ are also a differential signal. The polarity of synchronous signals $X_P$ and $X_N$ controls switching signals A, B, C, and D (shown in FIG. 1). An AND gate 222 and a buffer 223 generate synchronous signals $X_P$ and $X_N$. The synchronous signal $X_P$ is generated at the output of AND gate 222. The synchronous signal $X_N$ is outputted by the buffer 223. The input of the buffer 223 is the oscillation signal $PS_2$. The oscillation signal $PS_3$, the power-on signal $PS_{ON}$ and the off-control signal $S_{OFF}$ are connected to the AND gate 222. Therefore, switching signals A, B, C, and D are controlled by the off-control signal $S_{OFF}$ and the power-on signal $PS_{ON}$.

Furthermore, a linear-predict circuit (LPC) 750 is used for generating the drive signal $S_B$. The drive signal $S_B$ is coupled to control the flyback switch 70 (shown in FIG. 1.) in response to a program signal $R_P$, the pulse width modulation signal (PWM) and pulse signals $S_P$ and $S_N$. A programming device, such as the resistor 95 is applied to generate the program signal $R_P$.

Figure 3:
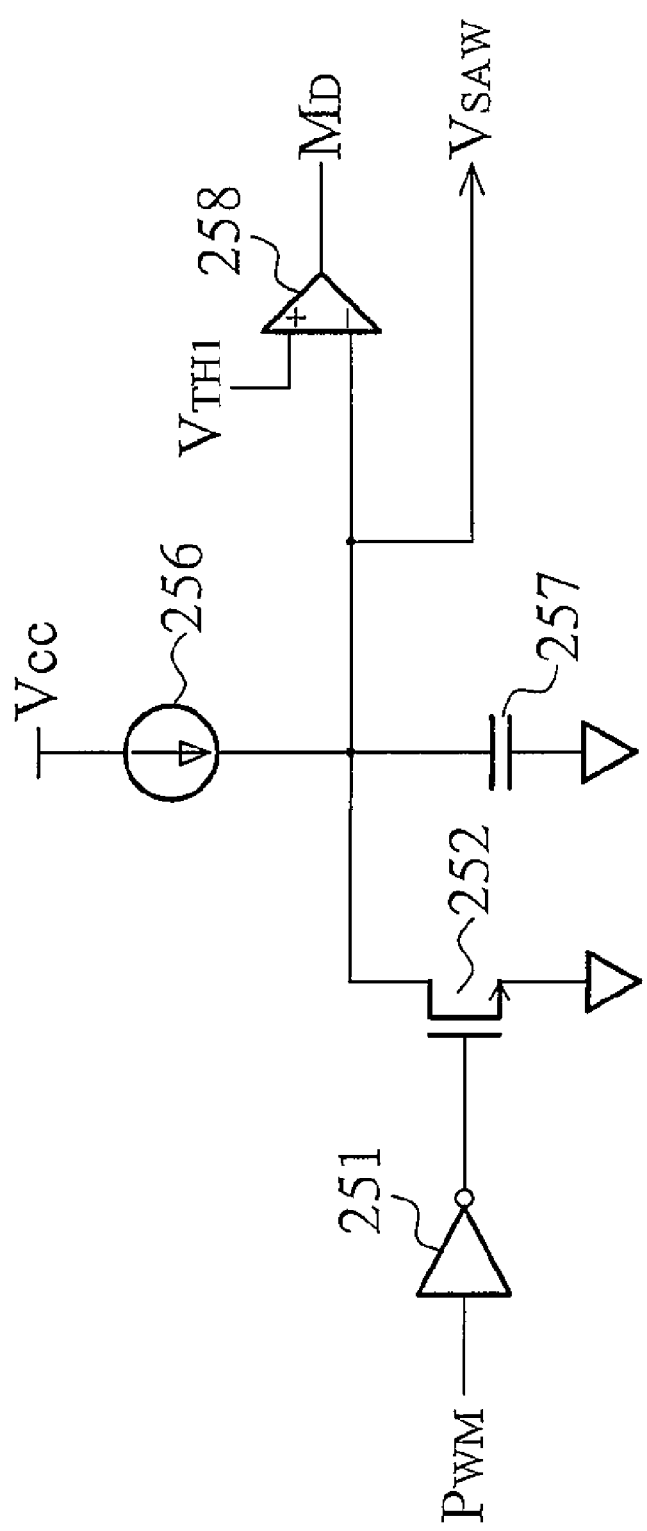
FIG. 3 is a ramp circuit according to an embodiment of the invention.

FIG. 3 is the circuit schematic of the ramp circuit 250. A current source 256 is utilized to charge a capacitor 257 in response to the enable of the pulse width modulation signal (PWM). The pulse width modulation signal (PWM) is connected to discharge the capacitor 257 through an inverter 251 and a transistor 252 when the pulse width modulation signal (PWM) is disabled. The ramp signal $V_{SAW}$ is thus generated at the capacitor 257. A threshold voltage $V_{TH1}$ is connected to the input of a comparator 258. Another input of the comparator 258 is connected to the ramp signal $V_{SAW}$. The output of the comparator 258 will generate the maximum-duty signal $M_D$ to disable the pulse width modulation signal (PWM) once the ramp signal $V_{SAW}$ is higher than the threshold voltage $V_{TH1}$. Therefore, the maximum turn-on period of the pulse width modulation signal PWM is limited.

Figure 4:
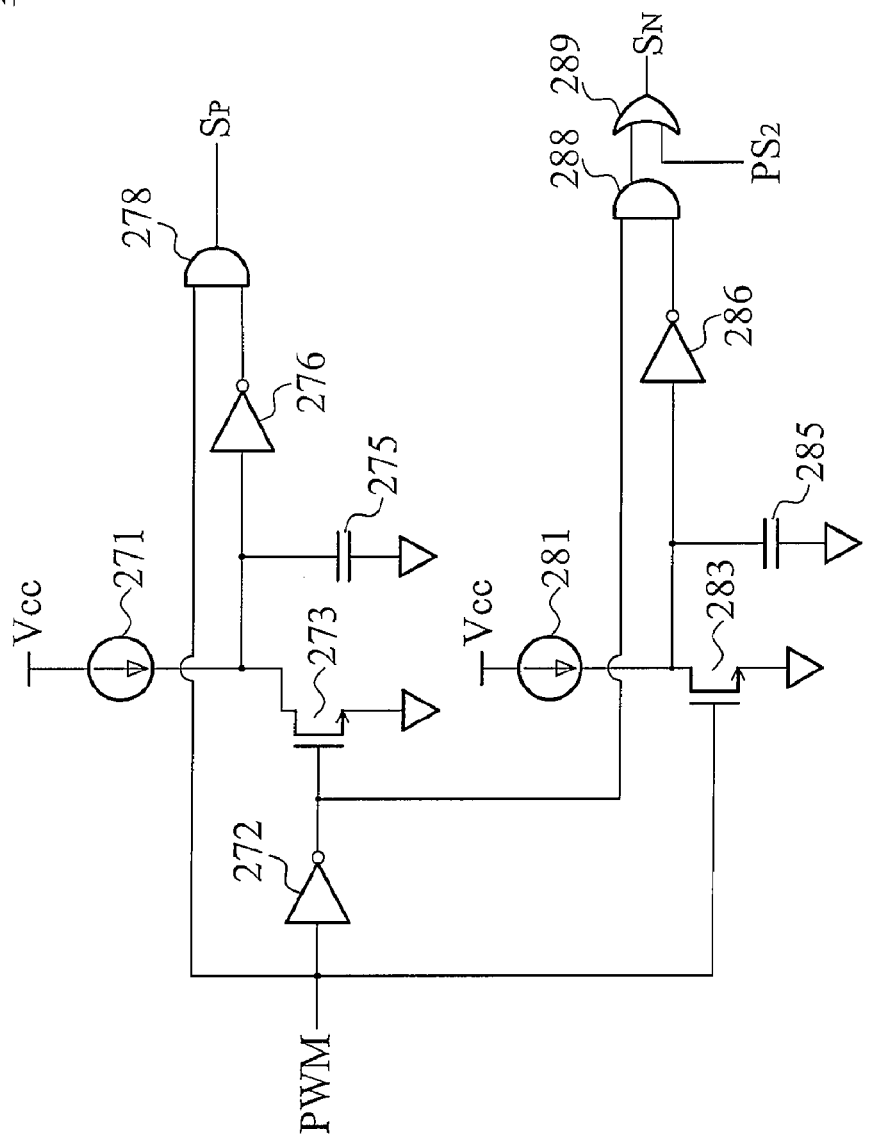
FIG. 4 is a pulse signal generator according to an embodiment of the invention.

FIG. 4 shows the circuit of the pulse signal generator 270. The pulse signals $S_P$, $S_N$ are the differential signal. Positive-polarity pulse signals $S_P$ and $S_N$ are generated in response to the rising edge of the pulse width modulation signal (PWM). Negative-polarity pulse signals $S_P$ and $S_N$ are generated in response to the falling edge of the pulse width modulation signal (PWM) and the oscillation signal $PS_2$. Therefore, pulse signals $S_P$ and $S_N$ are one-shot signal. The pulse width of pulse signals $S_P$ and $S_N$ are shorter than the pulse width of switching signals A, B, C, and D. A current source 271 is connected to charge a capacitor 275. The pulse width modulation signal PWM is coupled to discharge the capacitor 275 via an inverter 272 and a transistor 273 when the PWM is disabled. The capacitor 275 is connected to the input of an inverter 276. The inputs of an AND gate 278 are connected to the output of the inverter 276 and the pulse width modulation signal PWM. A current source 281 is connected to charge a capacitor 285. The pulse width modulation signal PWM is coupled to discharge the capacitor 285 through a transistor 283 when the PWM is enabled. The capacitor 285 is connected to the input of an inverter 286. The inputs of an AND gate 288 are connected to the output of the inverter 286 and the output of the inverter 272. The output of the AND gate 288 and the oscillation signal $PS_2$ is connected to an OR gate 289. The output of the AND gate 278 and the output of the OR gate 289 generate pulse signals $S_P$ and $S_N$. The pulse width of pulse signals $S_P$ and $S_N$ is determined by the current of current sources 271 and 281 and the capacitance of capacitors 275 and 285.

Figure 5:
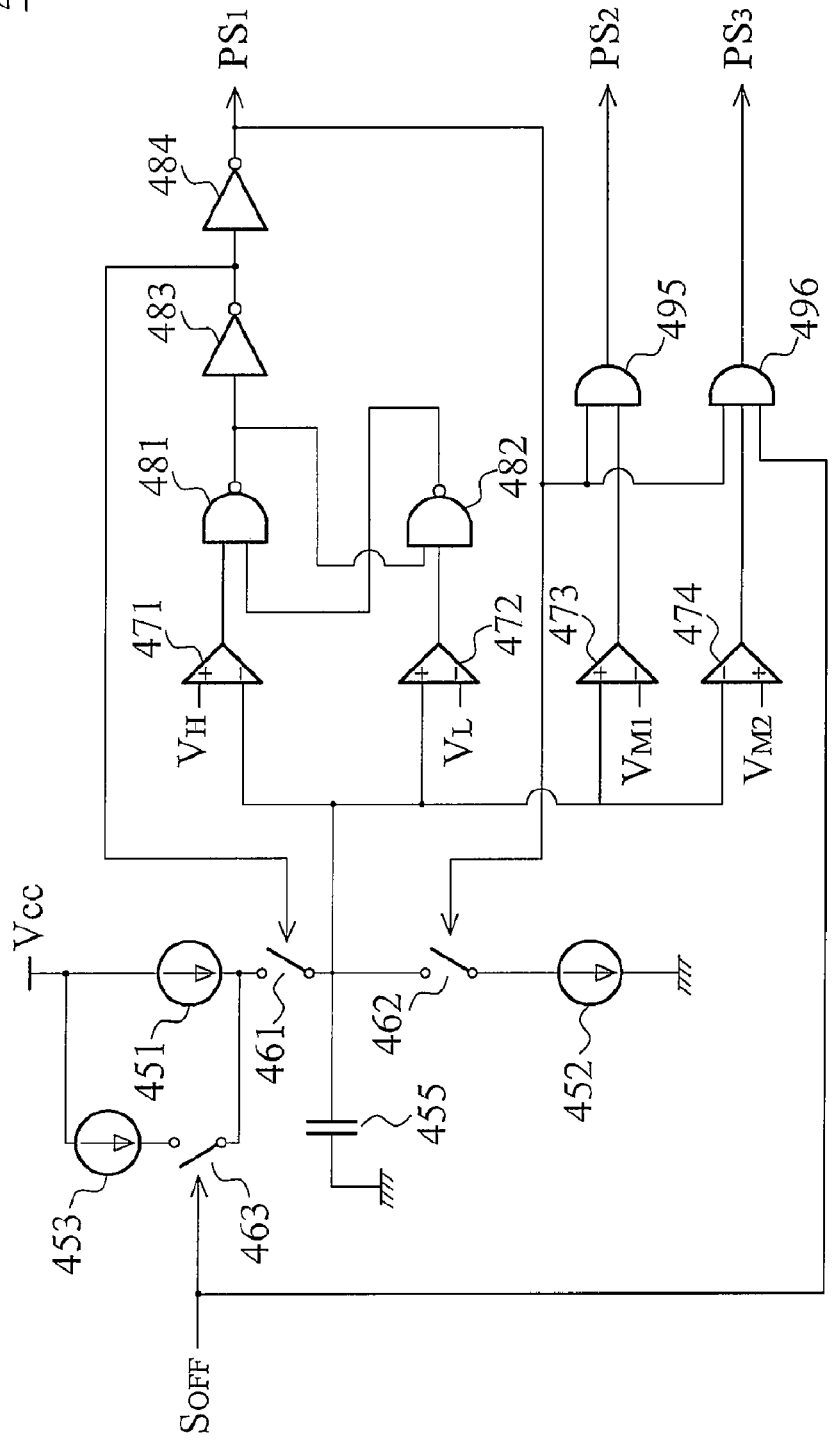
FIG. 5 is an embodiment of an oscillation circuit.

FIG. 5 shows the oscillation circuit 450. It generates oscillation signals $PS_1$, $PS_2$ and $PS_3$. A current source 451 is coupled to charge a capacitor 455 via a switch 461. A current source 453 is coupled to charge the capacitor 455 via a switch 463 and the switch 461. Another current source 452 is coupled to discharge the capacitor 455 through a switch 462. A sawtooth signal is thus generated on the capacitor 455. The capacitor 455 is further connected to comparators 471, 472, 473 and 474. Comparators 471, 472, 473 and 474 have threshold voltages $V_H$ and $V_L$, $V_{M1}$ and $V_{M2}$, respectively. NAND gates 481 and 482 develop a SR-latch coupled to the output of comparators 471 and 472. The output of the NAND gate 481 generates a charge signal through an inverter 483. The charge signal is connected to control the switch 461. The output of the inverter 483 is connected to another inverter 484 to generate the oscillation signal $PS_1$. The oscillation signal $PS_1$ is also coupled to control the switch 462 and AND gates 495 and 496. The input of the AND gate 495 is connected to the output of the comparator 473 for generating the oscillation signal $PS_2$. Furthermore, the input of the AND gate 496 are connected to the output of the comparator 474 and the off-control signal $S_{OFF}$ for generating the oscillation signal $PS_3$. The off-control signal $S_{OFF}$ is further connected to control the switch 463. The frequency of the oscillation signals $PS_1$, $PS_2$ and $PS_3$ are thus decreased in response to the enable (active low) of the off-control signal $S_{OFF}$.

Figure 6:
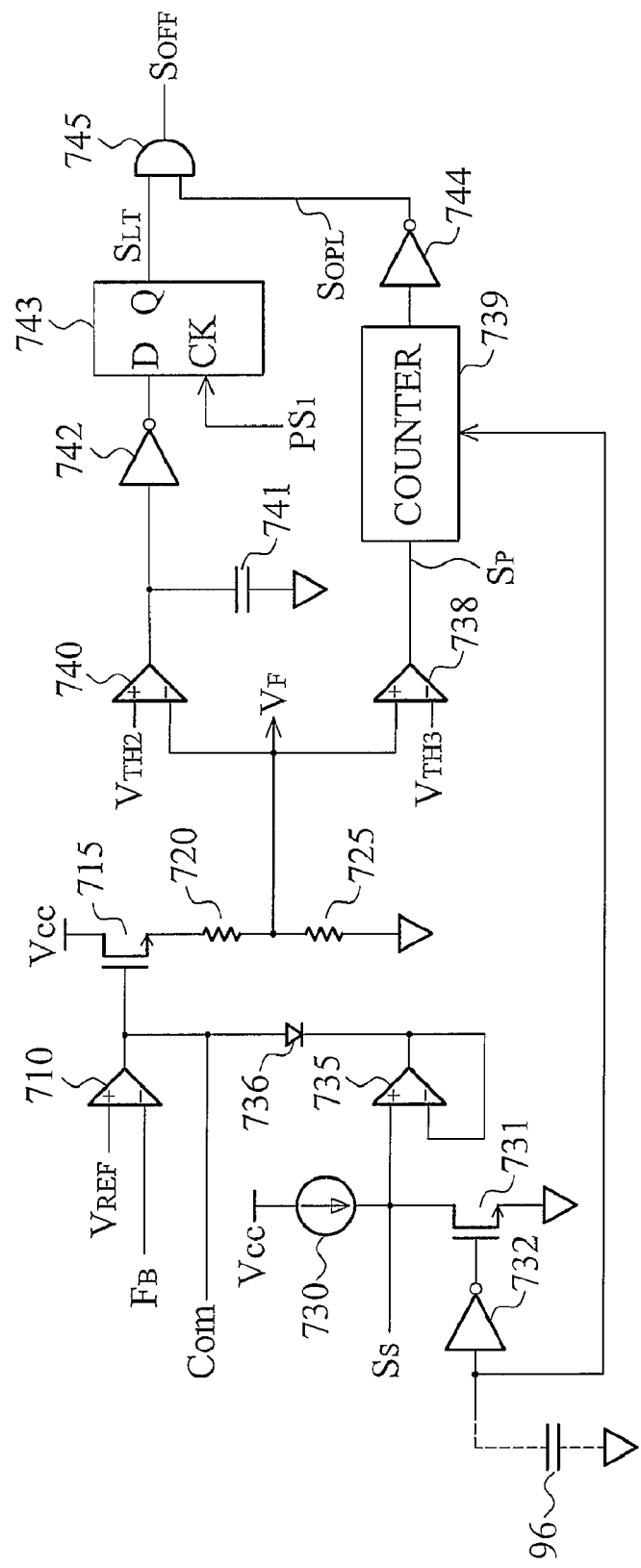
FIG. 6 is an embodiment of a feedback circuit.

FIG. 6 shows the feedback circuit 700. The error amplifier includes an operational amplifier 710, a level-shift transistor 715 and resistors 720 and 725. The soft start circuit is developed by a current source 730, a discharge transistor 731, a unit-gain buffer 735, an inverter 732 and a diode 736. A comparator 740, a capacitor 741, an inverter 742 and a flip-flop 743 form the power management circuit. Furthermore, a comparator 738, an up/down counter 739 and an inverter 744 develop a protection circuit for providing the open loop protection.

A reference voltage $V_{REF}$ and the feedback signal $F_B$ are coupled to the operational amplifier 710. The operational amplifier 710 is a trans-conductance amplifier. The operational amplifier 710 has an output terminal Com connected to the capacitor 93 for the loop compensation. The output terminal Com is further controlled by the unit-gain buffer 735 through the diode 736. The input of the unit-gain buffer 735 is coupled to the soft-start signal $S_S$. The current source 730 associates with the capacitor 96 generates the soft-start signal $S_S$. The transistor 731 is used to discharge the capacitor 96 in response to the power-on signal $PS_{ON}$. Therefore, the soft-start circuit will generate the soft-start signal $S_S$ in response to the power-on signal $PS_{ON}$. The level-shift transistor 715 and resistors 720, 725 provide level shift and attenuation to the output signal of the operational amplifier 710. The error signal $V_F$ is generated at the resistor 725.

A threshold $V_{TH2}$ is connected to the positive input of the comparator 740. The negative input of the comparator 740 is coupled to receive the error signal $V_F$. A power-management signal will be generated at the output of the comparator 740 once the error signal $V_F$ is lower than the threshold $V_{TH2}$. The enable of the power-management signal shows the light load of the power converter. A capacitor 741 is connected to the output of the comparator 740 for providing a debounce. The enable of the power-management signal will generate a light-load signal $S_{LT}$ to the output of the flip-flop 743 in response to the oscillation signal $PS_1$. The light-load signal $S_{LT}$ is further connected to an AND gate 745 to generate the off-control signal $S_{OFF}$. Another input of the AND gate 745 is coupled to receive an open-loop signal $S_{OPL}$. The open-loop signal $S_{OPL}$ is produced at the output of the up/down counter 739 through the inverter 744. A threshold $V_{TH3}$ is connected to the negative input of the comparator 738. The positive input of the comparator 738 is coupled to receive the error signal $V_F$. A protection signal $S_P$ will be generated at the output of the comparator 738 once the error signal $V_F$ is higher than the threshold $V_{TH3}$. The enable of the protection signal $S_P$ shows the output of the power converter is over-loaded and/or short-circuited. If the protection signal $S_P$ is generated, then the open-loop signal $S_{OPL}$ will be produced after the delay and the debounce of the up/down counter 739. The off-control signal $S_{OFF}$ is thus generated in accordance with the light-load signal $S_{LT}$ and the protection signal $S_P$. The light load signal $S_{LT}$ is generated during the light load of the power converter. The protection signal $S_P$ is produced when the feedback of the power converter is open loop.

Figure 7:
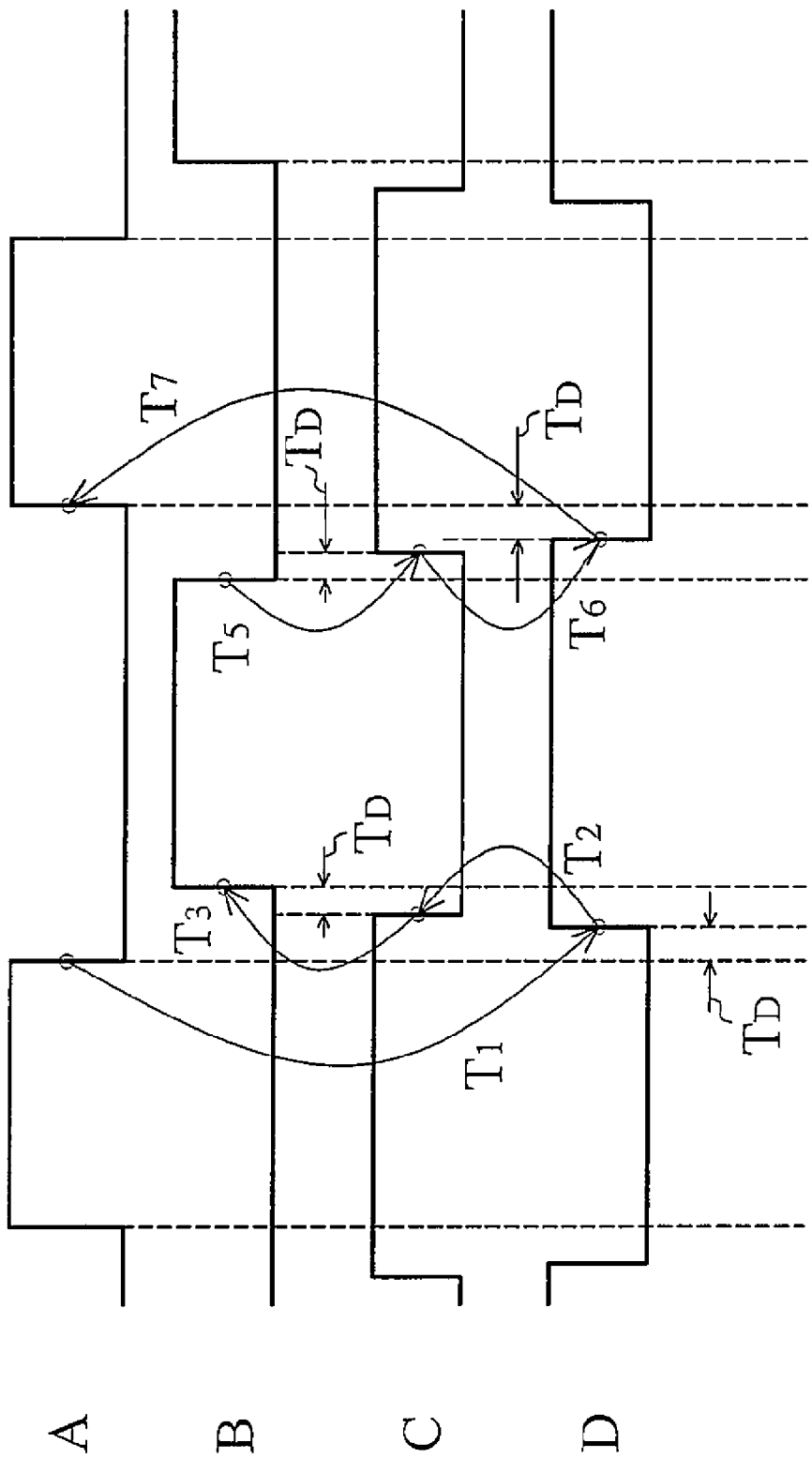
FIG. 7 shows waveforms of switching signals A, B, C, and D according to an embodiment of the invention.

FIG. 7 shows waveforms of switching signals A, B, C, and D. Referring to FIG. 7 and FIG. 1, the T1 stage shows the switching signal D will be turned on after a time delay $T_D$ once the switching signal A is turned off. The circular current produced by the leakage inductance $L_{PL}$ (the leakage inductance of the primary winding $N_P$ of the transformer 10) will turn on a diode 36, which results a soft switching on the power switch 35. The leakage inductance $L_{PL}$ and the parasitic capacitance $C_J$ of the power switch form a resonant tank. Its resonant frequency is $$F_R = \frac{1}{2\pi\sqrt{L_{PL} \times C_J}} \quad (1)$$

The delay time $T_D$ needed for achieving the soft switching is given by:

$$T_D = 1/(4 \times F_R) \quad (2)$$

The switching signal C is turned off at T2 stage. The switching signal B is turned on after another time delay $T_D$, the power switch 30 is therefore soft switched after the diode 31 is on (T3 stage). The T5 stage shows the switching signal C is turned on after the time delay $T_D$ once the switching signal B is turned off. The circular current will turn on a diode 26 before switching on the power switch 25. The switching signal D is turned off at T6 stage. The switching signal A is turned on after a time delay $T_D$, therefore the power switch 20 is soft switched after the diode 21 is on (T7 stage). Accordingly, as there are phase shifts of between switching signals A and D, and between switching signals B and C, soft switching of corresponding switching-transistors is achieved.

Figure 8:
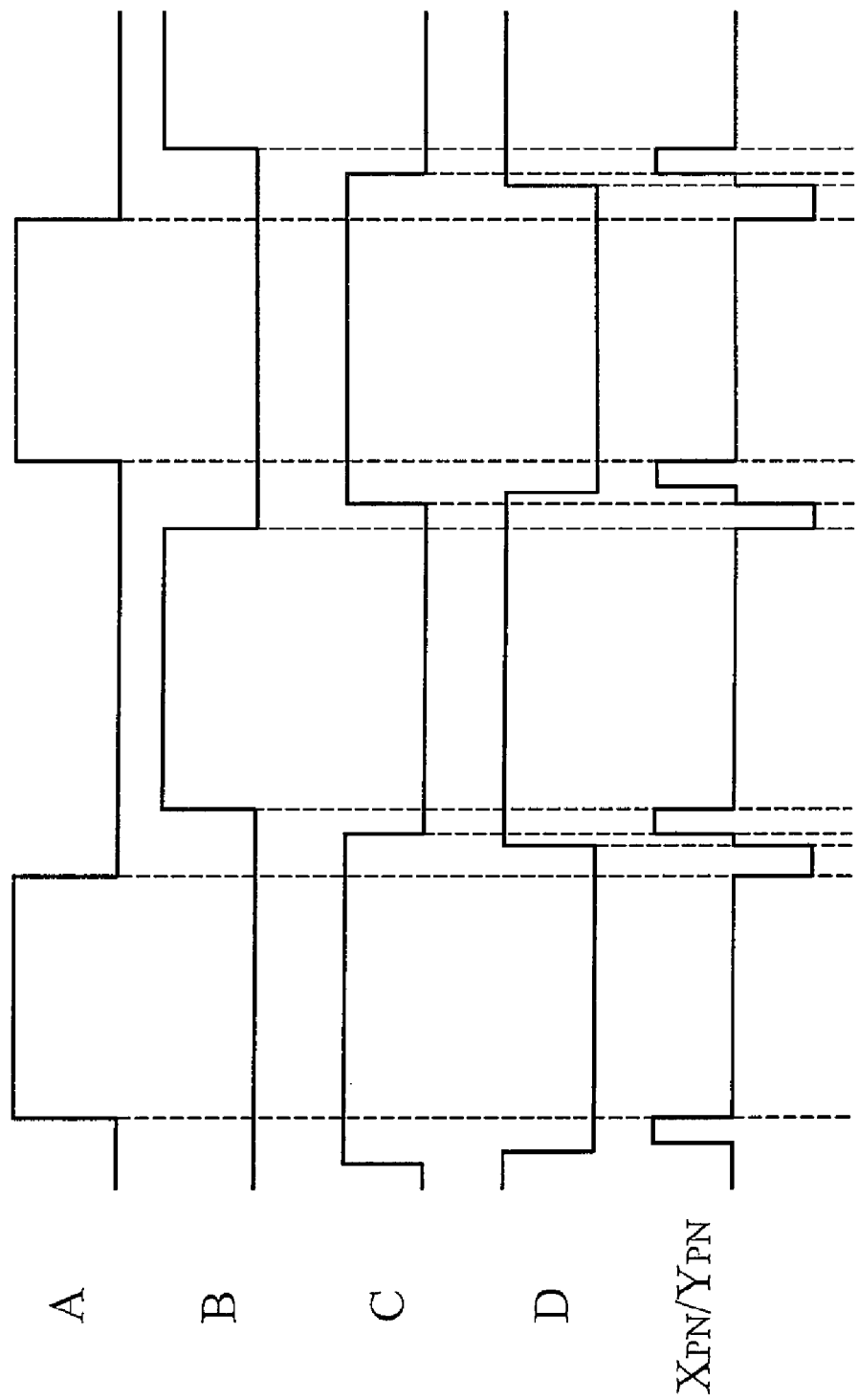
FIG. 8 shows waveforms of switching signals and synchronous signals.

FIG. 8 shows the waveforms of switching signals A, B, C, D, and synchronous signals $X_{PN}$ and $Y_{PN}$ ($X_{PN}$ represents a differential signal between $X_P$ and $X_N$; $Y_{PN}$ represents the differential signal between $Y_P$ and $Y_N$). Negative-polarity synchronous signals $X_{PN}$ and $Y_{PN}$ are generated to turn off of switching signals A and B. Positive-polarity synchronous signals $X_{PN}$ and $Y_{PN}$ are generated to turn on of switching signals A and B. The pulse width of synchronous signals $X_{PN}$ and $Y_{PN}$ are correlated to the time delay $T_D$ of switching signals A, B, C and D. The time delay $T_D$ is thus developed between switching signals A, B, C, and D in response to synchronous signals $X_{PN}$ and $Y_{PN}$.

Figure 9:
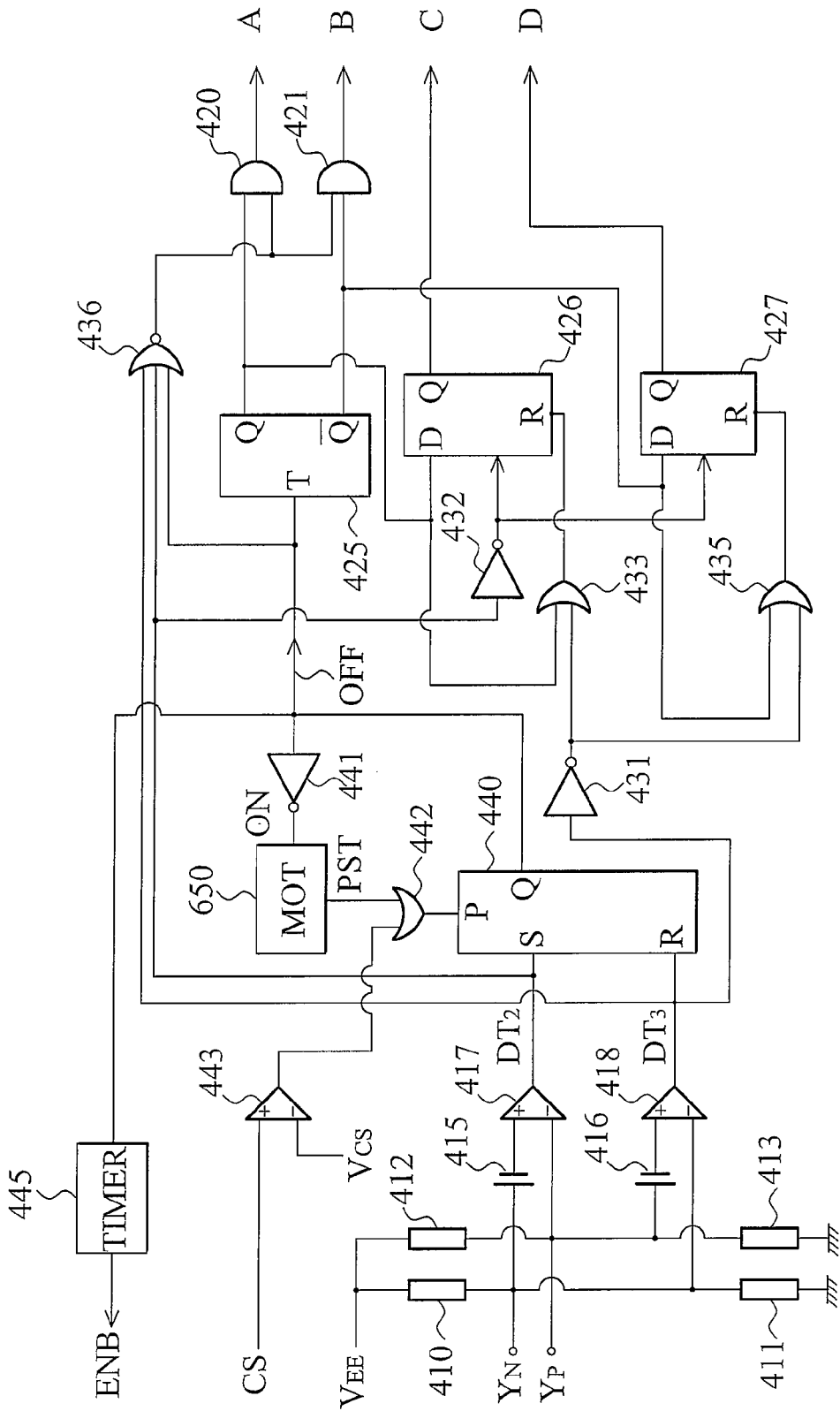
FIG. 9 is a primary-side switching circuit according to an embodiment of the invention.

FIG. 9 is the circuit schematic of the primary-side switching circuit 40. Resistors 410 and 411 and resistors 412 and 413 provide bias termination for receiving the synchronous signals $Y_P$ and $Y_N$. Synchronous signals $Y_P$ and $Y_N$ are coupled to comparators 417 and 418. Comparators 417 and 418 have offset voltages 415 and 416 respectively, which produces hysteresis for the comparison. A delay-time signal $DT_2$ is generated at the output of the comparator 417. A delay-time signal $DT_3$ is generated at the output of the comparator 418. Delay-time signals $DT_2$ and $DT_3$ are coupled to the input of a SR-flip-flop 440. The SR-flip-flop 440, an OR gate 442, an inverter 441, a maximum-on-time (MOT) circuit 650 and a comparator 443 form a signal generator to generate an off signal OFF at the output of the SR-flip-flop 440. The off signal OFF is generated in response to synchronous signals $Y_P$ and $Y_N$. The off signal OFF is coupled to turn off switching signals A, B and change the state of switching signals A, B, C and D. The preset-input of the SR-flip-flop 440 is controlled by the output of the OR gate 442. The input of the OR gate 442 is controlled by the output of the comparator 443 and the maximum-on-time circuit 650. The negative input of the comparator 443 is connected to the over-current threshold $V_{CS}$. The positive input of the comparator 443 is coupled to the current-sense signal CS. The off signal OFF will be generated once the current-sense signal CS is over the over-current threshold $V_{CS}$. In addition, the output of the SR-flip-flop 440 generates an on signal ON through the inverter 441. The on signal ON is coupled to the input of the maximum-on-time circuit 650. The output of the maximum-on-time circuit 650 generates a preset signal PST connected to the input of the OR gate 442. If the off signal OFF is disabled and over a maximum-on-time period of the maximum-on-time circuit 650, then the preset signal PST will preset the SR-flip-flop 440 to enable the off signal OFF.

The off signal OFF is connected to a T-flip-flop 425 for the divide-by-two. The Q and /Q outputs of the T-flip-flop 425 are connected to AND gates 420 and 421 to generate switching signal A and B, respectively. Another inputs of AND gates 420 and 421 are coupled to receive the off signal OFF through a NOR gate 436. The pulse width of the off signal OFF provides the dead time for switching signals A and B. The delay-time signal $DT_2$ is connected to enable D-flip-flops 426 and 427 via an inverter 432. The D-input of D-flip-flops 426 and 427 is respectively connected to the Q and /Q output of the T-flip-flop 425.

The output of the D-flip-flop 426 generates the switching signal C. The output of the D-flip-flop 427 produces the switching signal D. The delay-time signal $DT_3$ is coupled to reset the D-flip-flops 426 through an inverter 431 and an OR gates 433. Another input of the OR gate 433 is controlled by the Q output of the T-flip-flop 425. The delay-time signal $DT_3$ is further coupled to reset the D-flip-flop 427 through the inverter 431 and an OR gate 435. Another input of the OR gate 435 is connected to the /Q output of the T-flip-flop 425. A timer 445 is coupled to receive the off signal OFF for generating the enable signal ENB. If the off signal OFF is continuously enabled (disable switching signals A and B) over an expired period of the timer 445, then the enable signal ENB will be generated. Consequently, the disable of the power-on signal $PS_{ON}$ will produce the off signal OFF through synchronous signals $Y_P$ and $Y_N$. The off signal OFF will disable switching signals A and B and turn off the enable signal ENB. After that, the enable signal ENB will turn off the PFC circuit and the power converter.

Figure 10:
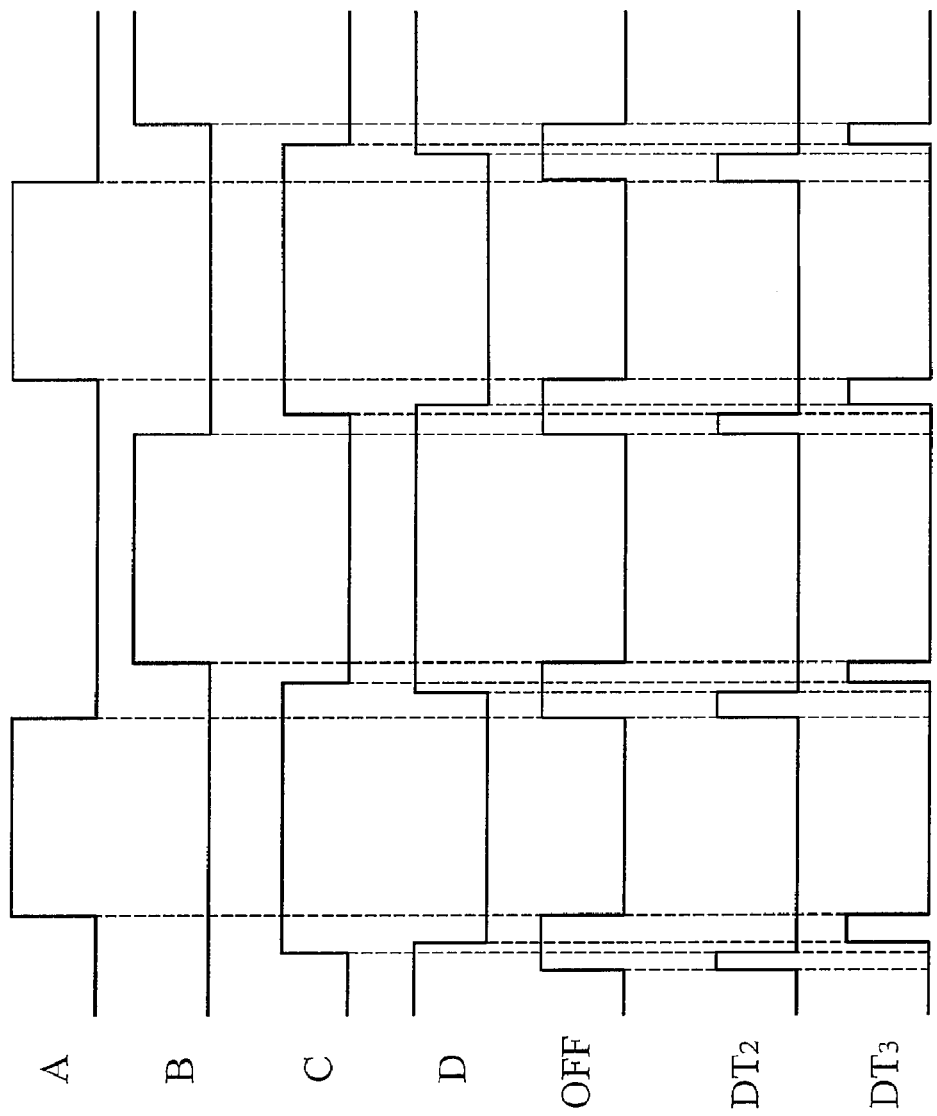
FIG. 10 shows waveforms of the switching signal and the oscillation signal.

FIG. 10 shows the waveforms of switching signals A, B, C and D, the off signal OFF and delay-time signals $DT_2$ and $DT_3$. The off signal OFF is a short-pulse signal that provides the dead time for switching signals A and B. The delay-time signal $DT_2$ is generated when the off signal OFF is enabled. The delay-time signal $DT_3$ is generated after the delay-time signal $DT_2$ is disabled. The delay-time signal $DT_3$ is disabled when the off signal OFF is disabled.

Figure 11:
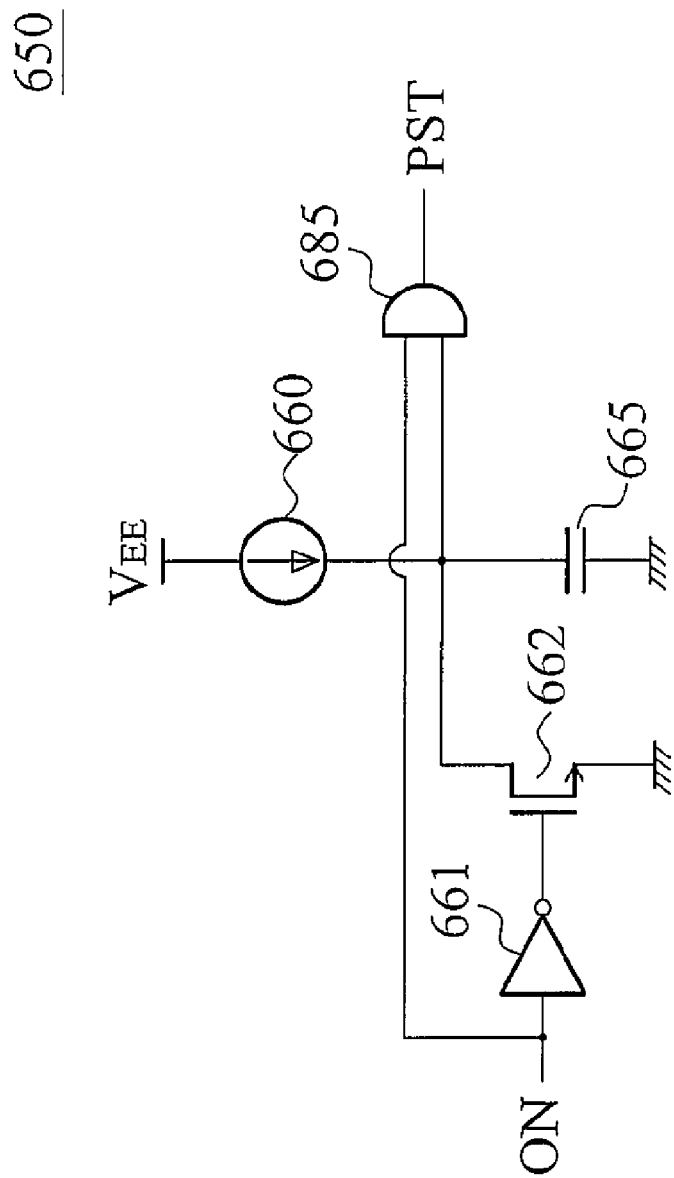
FIG. 11 is a maximum-on-time circuit according to an embodiment of the invention.

FIG. 11 is the maximum-on-time (MOT) circuit 650. A current source 660 is connected to charge a capacitor 665. A transistor 662 is connected to discharge the capacitor 665. The on signal ON is coupled to control the transistor 662 through an inverter 661. The on signal ON is further connected to an AND gate 685. Another input of the AND gate 685 is coupled to the capacitor 665. Once the on signal ON is enabled, the output of the AND gate 685 will generate the preset signal PST after the maximum-on-time period. The maximum-on-time period is determined by the current of the current source 660 and the capacitance of the capacitor 665.

Figure 12:
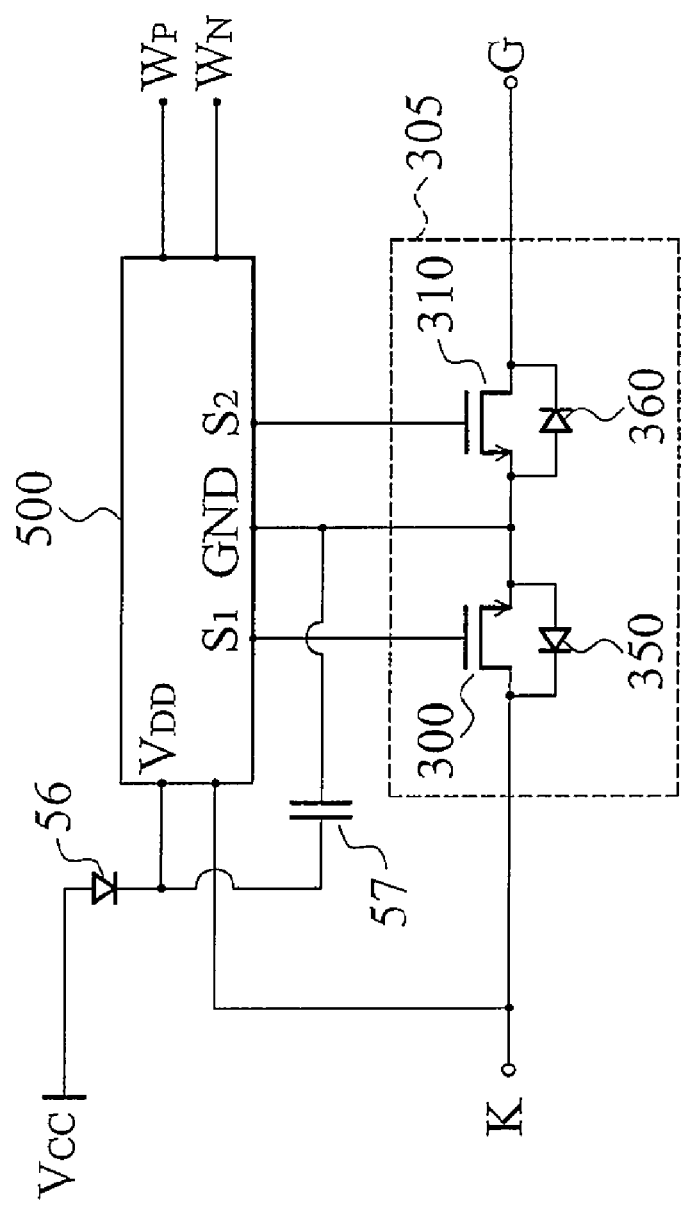
FIG. 12 is the schematic diagram of a synchronous switch according to an embodiment of the invention.

FIG. 12 is the schematic diagram of a synchronous switch 50 according to an embodiment of the invention. It represents the circuit of synchronous switches 51 and 52 shown in FIG. 1. The synchronous switch 50 includes a power switch set 305 including power switches 300 and 310, diodes 350, 360 and 56, a capacitor 57 and a control circuit 500. The diode 350 is connected to the power switch 300 in parallel. The diode 360 is connected to the power switch 310 in parallel. Power switches 300 and 310 are connected in series and back-to-back. Power switches 300 and 310 are further connected between the terminal K and the terminal G. The terminal K is coupled to the secondary side of the transformer 10 (shown in FIG. 1). The terminal G is coupled to the output of the power converter. A first input terminal and a second input terminal of the control circuit 500 are coupled to receive pulse signals $W_P$ and $W_N$ for generating gate-drive signals S1 and S2. Gate-drive signals S1 and S2 are couple to turn on/off state the power switch 300 and 310, respectively. The diode 56 and the capacitor 57 form a charge-pump circuit to provide the power supply to the control circuit 500. A $V_{CC}$ power source is connected to charge the capacitor 57 through the diode 56. A $V_{DD}$ terminal and GND terminal of the control circuit 500 are parallel connected to the capacitor 57. The GND terminal is further connected to the source of power switches 300 and 310.

Figure 13:
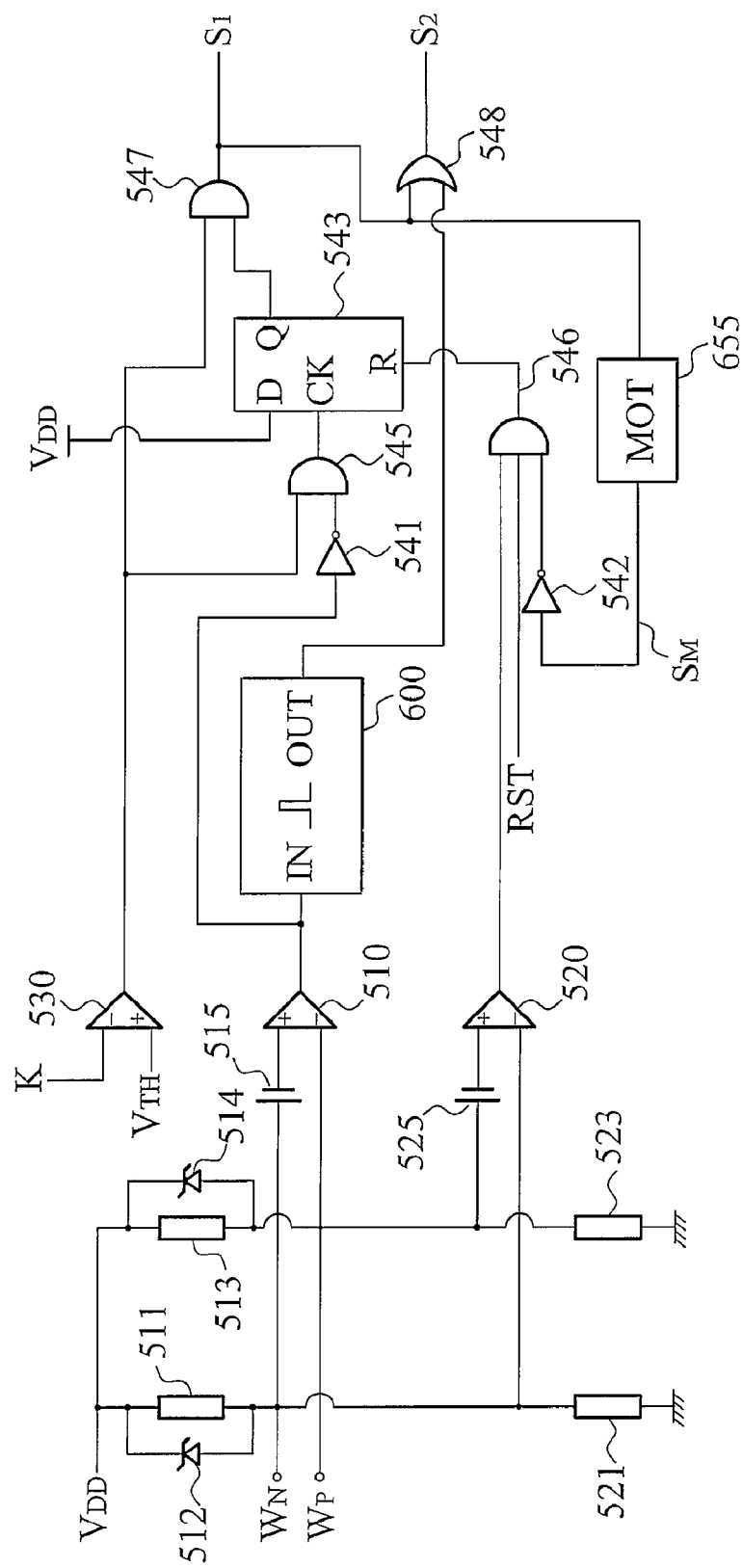
FIG. 13 is the schematic diagram of a control circuit 500 according to an embodiment of the invention.

FIG. 13 is the schematic diagram of a control circuit 500 according to an embodiment of the invention. Resistors 511, 521 and 513, 523 provide the bias termination for receiving pulse signals $W_P$ and $W_N$. Zener diodes 512 and 514 are used for the protection. Pulse signals $W_P$ and $W_N$ are coupled to comparators 510 and 520. Comparators 510 and 520 have offset voltages 515 and 525, respectively, which produces hysteresis for the comparison. A comparator 530 having a threshold $V_{TH}$ connects to its positive input. The negative input of the comparator 530 is coupled to the terminal K. The outputs of comparators 510 is coupled to enable a D-flip-flop 543 through an inverter 541 and an AND gate 545. The D-flip-flop 543 is operated as a latch circuit. Another input of the AND gate 545 is connected to the output of the comparator 530. The reset-input terminal R of the D-flip-flop 543 is controlled by the output of the comparator 520 via an AND gate 546. The output of the D-flip-flop 543 and the output of the comparator 530 are connected to an AND gate 547. The gate-drive signal $S_1$ is generated at the output of the AND gate 547 to control the on/off state of the power switch 300. The maximum turn-on period of the gate-drive signal $S_1$ is limited by a maximum-on-time (MOT) circuit 655. The gate-drive signal $S_1$ is connected to the maximum-on-time circuit 655. After a blanking time, a maximum-on-time signal $S_M$ will be produced in response to the enable of the gate-drive signal $S_1$. The maximum-on-time signal $S_M$ is connected to the AND gate 546 via an inverter 542. Another input of the AND gate 546 is connected to a power-on reset signal RST. The output of the AND gate 546 is couple to reset the D-flip-flop 543. The maximum turn-on period of the gate-drive signal $S_1$ is thus limited by the blanking time of the maximum-on-time circuit 655. The gate-drive signal $S_1$ will turn off the power switch 300 (shown in FIG. 12) once the pulse signal is generated as, $$V_{WP} - V_{WN} > V_{525} \quad (3)$$

The gate-drive signal $S_1$ (first control signal) will turn on the power switch 300 (first transistor) when equations (4) and (5) are met, $$V_{WN} - V_{WP} > V_{515} \quad (4)$$

$$V_K < V_{TH} \quad (5)$$

where $V_{WP}$ is the voltage of pulse signals $W_P$, and $V_{WN}$ is the voltage of pulse signal $W_N$ of the terminal K, $V_{TH}$ is the voltage of the threshold $V_{TH}$ and $V_{515}$ is the value of the offset voltage 515, and $V_{525}$ is the value of the offset voltage 525.

Referring to FIG. 12 and FIG. 13, the voltage of the terminal K will be lower than the voltage of the threshold $V_{TH}$ once the diode 350 (first diode) is conducted. The power switch 300 can only be turned on after the diode 350 is turned on, which synchronizes the switching and the polarity of the transformer 10, and achieves the soft switching of the power switch 300. Another gate-drive signal $S_2$ (second control signal) is generated at the output of an OR gate 548 for switching the on/off state of the power switch 310 (second transistor). One input terminal of the OR gate 548 is connected to the gate-drive signal $S_1$. The second input terminal of the OR gate 548 is controlled by a one-shot signal generator 600. The input of the one-shot signal generator 600 is connected to the output of the comparator 510. Therefore, the gate-drive signal $S_2$ is generated in response to pulse signals $W_P$ and $W_N$. After that, the on/off state of the gate-drive signal S2 is corresponding to the gate-drive signal $S_1$.

Figure 14:
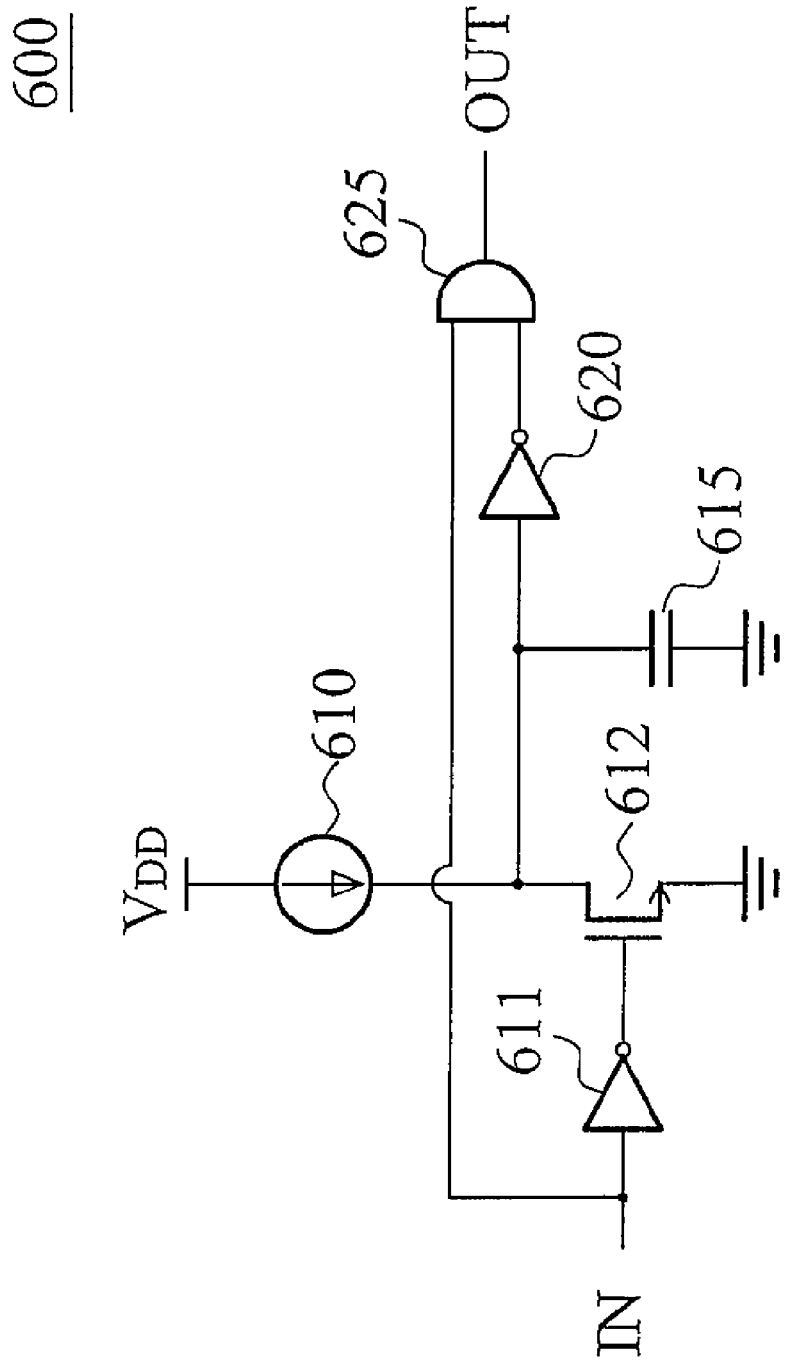
FIG. 14 show the circuit schematic of a one-short signal generator.

FIG. 14 shows the circuit schematic of the one-shot signal generator 600. A current source 610 is connected to charge a capacitor 615. A transistor 612 is connected to discharge the capacitor 615. The input signal is coupled to control the transistor 612 through an inverter 611. The input signal is further connected to an AND gate 625. Another input of the AND gate 625 is coupled to the capacitor 615 via an inverter 620. The output of the AND gate 625 generates the output signal of the one-shot signal generator 600. When the input signal is a logic-low, the capacitor is discharged and the output of the AND gate 625 is the logic-low. When the input signal is changed to the logic-high, the current source 610 will start to charge the capacitor 615. The AND gate 625 will output a one-shot signal. The current of the current source 610 and the capacitance of the capacitor 615 determine the pulse width of the one-shot signal.

Figure 15:
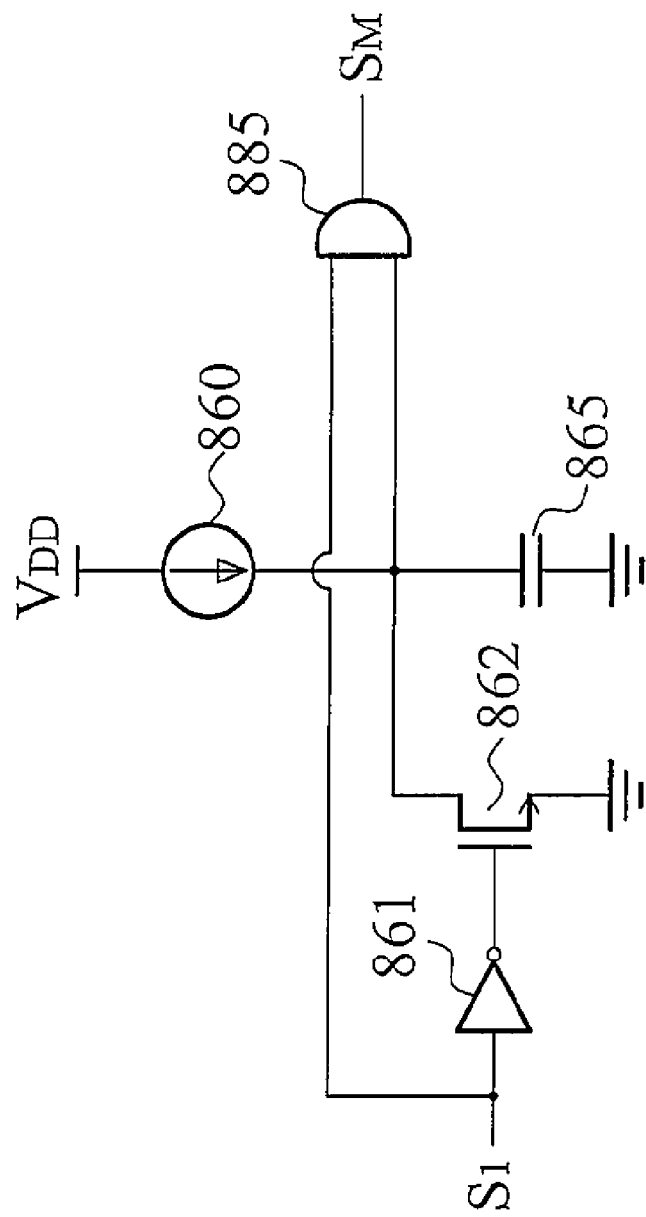
FIG. 15 is another maximum-on-time (MOT) circuit according to an embodiment of the invention.

FIG. 15 is the maximum-on-time (MOT) circuit 655. A current source 860 is connected to charge a capacitor 865. A transistor 862 is connected to discharge the capacitor 865. The gate-drive signal $S_1$ is coupled to control the transistor 862 through an inverter 861. The gate-drive signal $S_1$ is further connected to an AND gate 885. Another input of the AND gate 885 is coupled to the capacitor 865. Once the gate-drive signal $S_1$ is enabled, the output of the AND gate 885 will generate the maximum-on-time signal $S_M$ to disable the gate-drive signal $S_1$ after the blanking time. The blanking time is determined by the current of the current source 860 and the capacitance of the capacitor 865.

Figure 16:
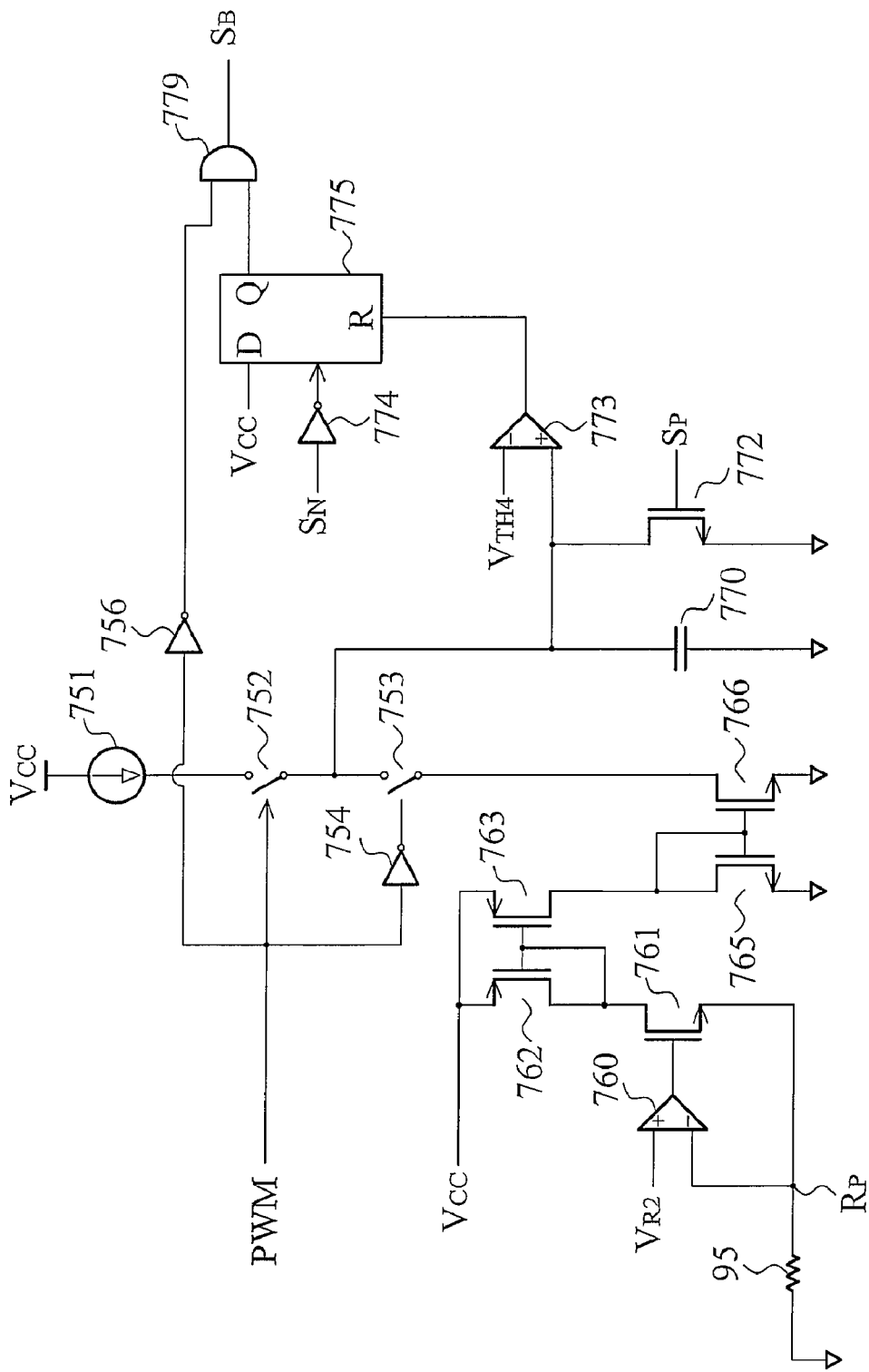
FIG. 16 is a preferred embodiment of a linear-predict circuit according to an embodiment of the invention.

FIG. 16 shows the linear-predict circuit 750. The linear-predict circuit 750 is developed to turn off the flyback switch 70 when the power converter is operated in the discontinuous current mode. Turning off the flyback switch 70 (shown in FIG. 2) will prevent a reverse current flowed from the output capacitor 85 to the flyback switch 70 during the discontinuous current mode. A current source 751 is coupled to charge a capacitor 770 via a switch 752. A discharge-current is coupled to discharge the capacitor 770 through a switch 753. The pulse width modulation signal PWM is coupled to control the switch 752. The pulse width modulation signal PWM is further coupled to control the switch 753 via an inverter 754. An operational amplifier 760, the resistor 95 and transistors 761, 762, 763, 765 and 766 develop a voltage-to-current converter. The operational amplifier 760 is coupled to receive the program signal $R_P$ for generating a discharge-current at the transistor 766. The program signal $R_P$ is generated in accordance with a reference voltage $V_{R2}$ and the resistance of the resistor 95. The capacitor 770 is charged in response to the enable of the pulse width modulation signal PWM, and discharged in response to the disable of the pulse width modulation signal PWM. Additionally, the pulse signal $S_P$ is coupled to discharge the capacitor 770 via a transistor 772. A linear-predict signal is thus generated in the capacitor 770. The pulse signal $S_N$ is coupled to enable a D-flip-flop 775 through an inverter 774. The pulse width modulation signal PWM and the output of the D-flip-flop 775 are connected to enable an AND gate 779 for producing the drive signal $S_B$ once the pulse width modulation signal PWM is disabled. The reset-input of the D-flip-flop 775 is connected to the output of a comparator 773. A threshold voltage $V_{TH4}$ is connected to the negative input of the comparator 773. The positive input of the comparator 773 is connected to the capacitor 770 to receive the linear-predict signal. When the linear-predict signal is lower than the threshold voltage $V_{TH4}$, the comparator 773 will reset the D-flip-flop 775 to disable the drive signal $S_B$. The drive signal $S_B$ is therefore generated in response to the program signal $R_P$ and the pulse width of the pulse width modulation signal PWM.

When the power converter operated in the boundary mode, the magnetized flux $\Phi_C$ of the inductor 80 is equal to its demagnetized flux $\Phi_D$. The boundary mode means the power converter is operated between the continuous current mode and the discontinuous current mode.

The equality is shown as, $$\Phi_C = \Phi_D \quad (6)$$

$$\Phi = B \times Ae = \frac{V \times T}{N} \quad (7)$$

$$\left[\left(\frac{V_{IN} \times N_S}{N_P}\right) - V_O\right] \times T_{CHARGE} = V_O \times T_{DISCHARGE} \quad (8)$$

$$T_{DISCHARGE} = \left\{\left[\left(\frac{V_{IN} \times N_S}{N_P}\right) - V_O\right] / V_O\right\} \times T_{CHARGE} \quad (9)$$

$$T_{DISCHARGE} = K \times T_{CHARGE} \quad (10)$$

where B is the flux density, Ae is the cross-section area of the inductor 80, $N_S$ and $N_P$ are the turn ratio of the transformer 10, the magnetized time ($T_{CHARGE}$) is equivalent to the pulse width of the pulse width modulation signal PWM, and the demagnetized time ($T_{DISCHARGE}$) of the inductor 80 shows the boundary condition of the power converter.

The demagnetized time $T_{DISCHARGE}$ of the inductor 80 can be obtained in accordance with the equation (9). It also shows the demagnetized time $T_{DISCHARGE}$ can be predicted in accordance with the input voltage $V_{IN}$, the output voltage $V_O$ and the magnetized time $T_{CHARGE}$ (the pulse width of the pulse width modulation signal). If the input voltage $V_{IN}$ and the output voltage $V_O$ can be set as constant, the demagnetized time $T_{DISCHARGE}$ could be predicted by the equation (10), in which the K value is programmed by the program signal $R_P$. Therefore, the turn-on period of the drive signal $S_B$ can be generated in accordance with the demagnetized time $T_{DISCHARGE}$ shown in the equation (10).

Figure 17:
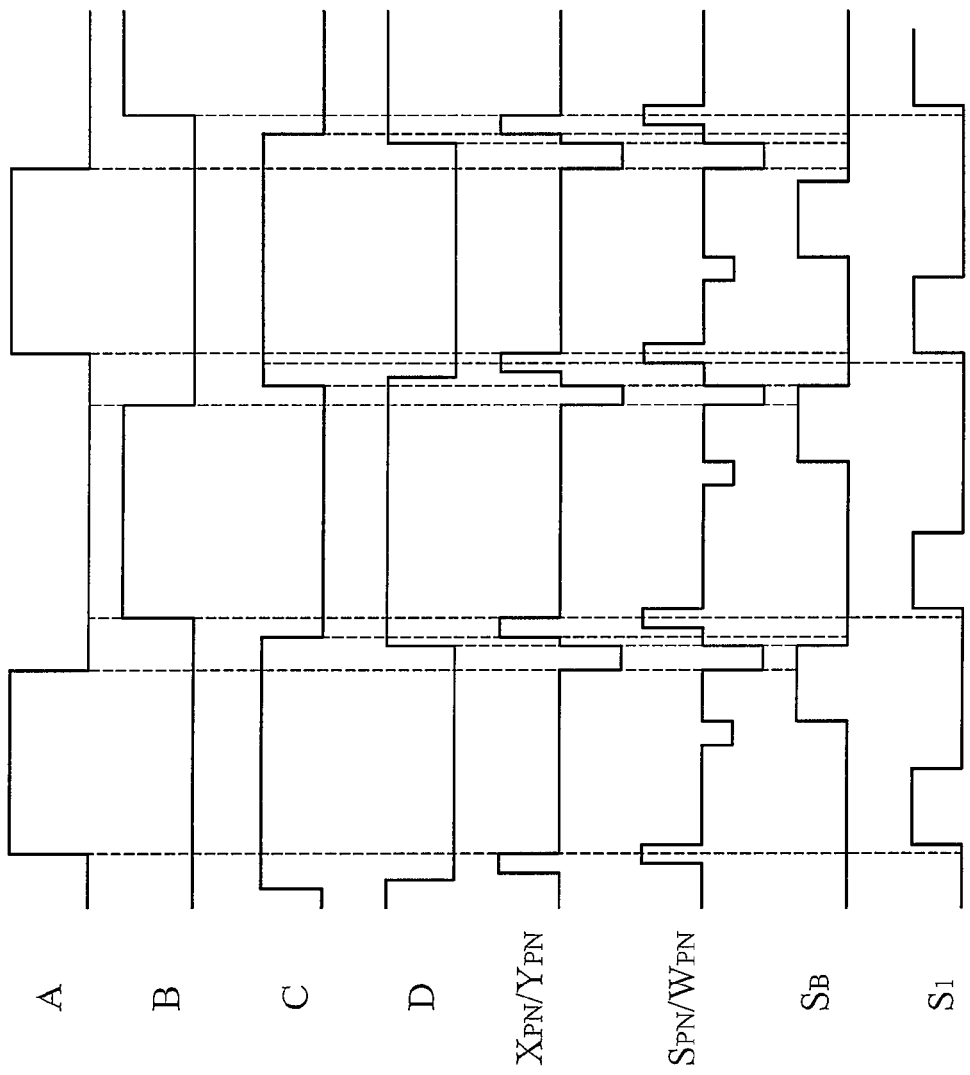
FIG. 17 shows signal waveforms according to an embodiment of the invention.
Figure 18:
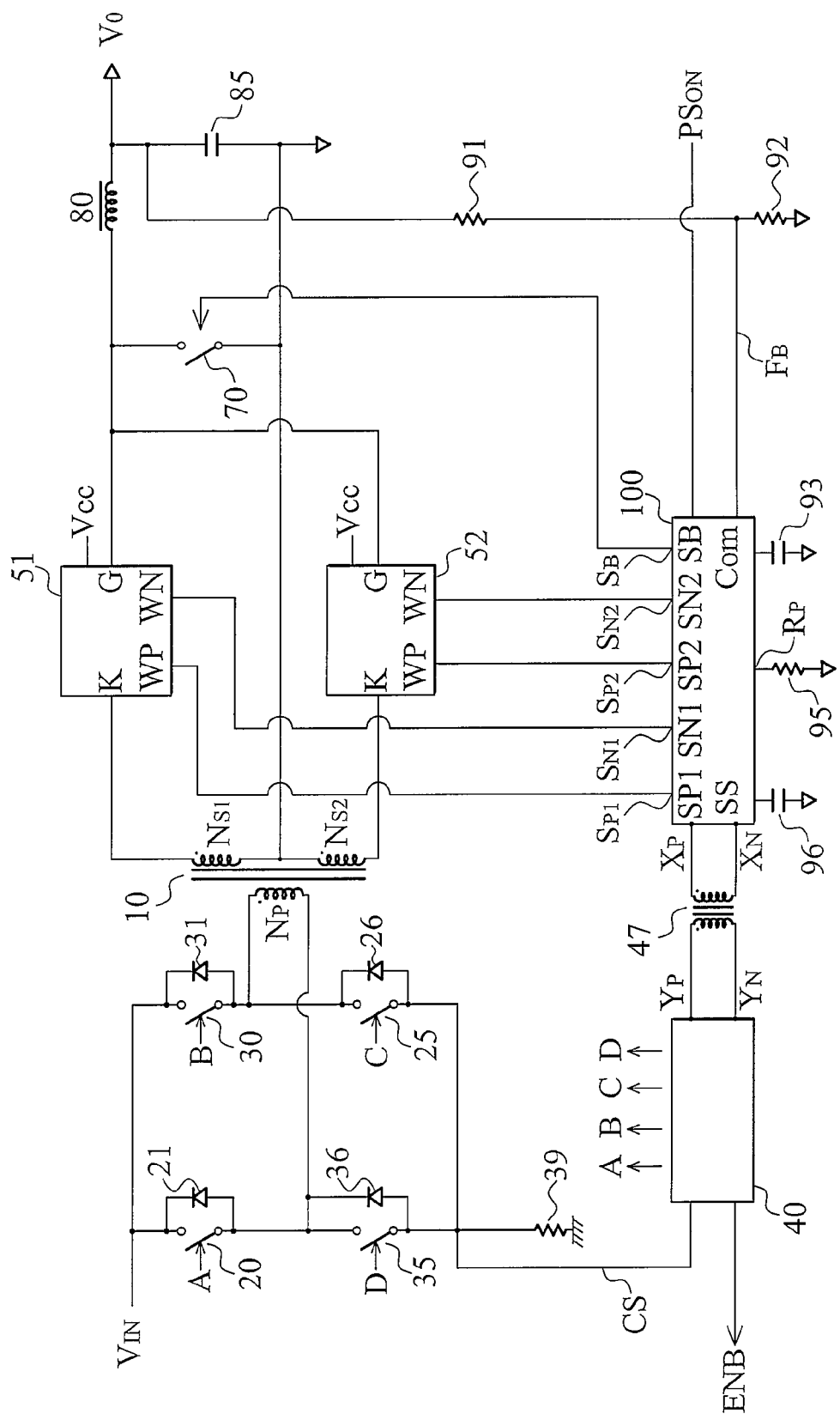
FIG. 18 shows an offline power converter with synchronous regulation circuit according to another embodiment of the invention, in which a pulse transformer is operated as the isolation device.

FIG. 17 shows waveforms of switching signals A, B, C and D, synchronous signals $X_{PN}$ and $Y_{PN}$, pulse signals $S_{PN}$ and $W_{PN}$ ($S_P$, $S_N$ and $W_P$, $W_N$), the gate-drive signal $S_1$ and the drive signal $S_B$. The drive signal $S_B$ is disabled before the power converter operated in the discontinuous current mode (the inductor 80 is fully demagnetized). FIG. 18 shows another preferred embodiment of a power converter with synchronous regulation circuit, in which a pulse transformer 47 is operated as the isolation device.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A synchronous regulation power converter, comprising:
   a secondary-side switching circuit coupled to an output of the power converter to generate a pulse signal and a synchronous signal in response to a feedback signal;
   an isolation device coupled to the secondary-side switching circuit for transferring the synchronous signal from a secondary side of the power converter to a primary side of the power converter;
   a primary-side switching circuit generating a switching signal coupled to switch a primary winding of a transformer in response to the synchronous signal; and
   a synchronous switch having a power switch set and a control circuit, wherein the power switch set is coupled from a secondary winding of the transformer to the output of the power converter and is operated to receive the pulse signal for turning on or turning off the power switch set according to the polarity of the pulse signal, the feedback signal is correlated to the output of the power converter, and the pulse signal is generated for rectifying and regulating the power converter.

2. The synchronous regulation power converter as claimed in claim 1, wherein the isolation device comprises a plurality of capacitors.

3. The synchronous regulation power converter as claimed in claim 1, further comprising a plurality of switching-transistors coupled to receive the switching signal for switching the transformer, wherein there is a phase shift between two of the switching signals to achieve soft switching of switching-transistors, and the phase shift of the switching signal is generated in accordance with the synchronous signal.

4. The synchronous regulation power converter as claimed in claim 1, wherein the primary-side switching circuit further comprises:
   a timer circuit generating an enable signal in response to the synchronous signal; and
   a maximum-duty circuit coupled to receive synchronous signal to limit the maximum duty of the switching signal, wherein the enable signal is coupled to control conditions of a power factor correction circuit of the power converter.

5. The synchronous regulation power converter as claimed in claim 1, further comprising a current-sense device generating a current-sense signal in response to the switching current of the transformer, wherein the current-sense signal is coupled to the primary-side switching circuit to disable the switching signal once the current-sense signal is over an over-current threshold.

6. The synchronous regulation power converter as claimed in claim 1, wherein the power switch set is formed by a first power switch and a second power switch connected in series, the first power switch has a first diode connected in parallel, and the second power switch has a second diode connected in parallel.

7. The synchronous regulation power converter as claimed in claim 1, wherein the control circuit generates a first-control signal and a second-control signal, the first-control signal is coupled to control the first power switch, the second-control signal is coupled to control the second power switch, and the first power switch is turned on once the first diode is conducted.

8. The synchronous regulation power converter as claimed in claim 1, wherein the isolation device is a pulse transformer.

9. The synchronous regulation power converter as claimed in claim 1, further comprising a flyback switch coupled to the power switch set to freewheel an inductor current of the power converter, wherein the flyback switch is turned on when the power switch set is turned off, and an turn-on period of flyback switch is correlated to the turn-on period of the power switch.

10. The synchronous regulation power converter as claimed in claim 1, wherein the secondary-side switching circuit comprises:
  a programming device generating a program signal; and
  a linear-predict circuit generating a drive signal to control the flyback switch in response to the program signal and the pulse signal.

11. The synchronous regulation power converter as claimed in claim 1, wherein the secondary-side switching circuit further comprises:
  an oscillation circuit generating oscillation signals;
  a pulse width modulation circuit generating a pulse width modulation signal in response to oscillation signals;
  an error amplifier coupled to the output of the power converter to receive the feedback signal and generate an error signal;
  a soft-start circuit generating a soft-start signal in response to a reset signal;
  a ramp circuit generating a ramp signal in response to the pulse width modulation signal;
  a comparator generating a clear signal to disable the pulse width modulation signal in response to the error signal and the ramp signal; and
  a pulse signal generator generating the pulse signal in accordance with the pulse width modulation signal, wherein the oscillation signals are coupled to generate the synchronous signal, the synchronous signal is a differential signal, the switching transistors are turned on or off in response to the polarity of the synchronous signal, the pulse width modulation signal is enabled in response to oscillation signals, the pulse width modulation signal is disabled in response to oscillation signals and the clear signal, the soft-start signal is coupled to control the pulse width of the pulse width modulation signal, the pulse signal is a differential signal, and the power switch set are turned on or off in response to the polarity of the pulse signal.

12. The synchronous regulation power converter as claimed in claim 10, wherein the secondary-side switching circuit further comprises a power management circuit coupled to receive the error signal for generating light-load signal, and the light-load signal is coupled to burst the switching signal during the light load of the power converter.

13. The synchronous regulation power converter as claimed in claim 1, wherein the synchronous switch comprises:
  a rectifying terminal coupled to the secondary side of the transformer;
  a regulated terminal coupled to the output of the power converter;
  a first input terminal; and
  a second input terminal, wherein the power switch set is connected between the rectifying terminal and the regulated terminal, the first input terminal and the second input terminal are coupled to receive the pulse signal for turning on or off the power switch.

14. The synchronous regulation power converter as claimed in claim 1, wherein the control circuit comprises a latch circuit coupled to receive the pulse signal for set or reset the latch circuit, and the latch circuit is coupled to turn on or off the power switch.

15. A synchronous regulation circuit for offline power converter, comprising:
  a secondary-side switching circuit coupled to the output of the power converter to generate a pulse signal and a synchronous signal in response to a feedback signal;
  a primary-side switching circuit generating a switching signal coupled to switch a transformer in response to the synchronous signal;
  a power switch set coupled from the transformer to the output of the power converter;
  a control circuit coupled to receives the pulse signal for turning on or off the power switch, wherein the feedback signal is correlated to the output of the power converter, the pulse signal is a first differential signal and coupled to control the power switch set for rectifying and regulating the power converter, the synchronous signal is also a second differential signal coupled from the secondary-side switching circuit to the primary-side switching circuit through an isolation device to generate the switching signal.

16. The synchronous regulation circuit as claimed in claim 15, wherein the isolation device is a pulse transformer or capacitors.

17. The synchronous regulation circuit as claimed in claim 15, further comprising a plurality of switching-transistors coupled to receive the switching signal for switching the transformer, wherein there is a phase shift between two of the switching signals to achieve soft switching of switching-transistors, and the phase shift of the switching signal pulse signal is generated in accordance with the synchronous signal.

18. The synchronous regulation circuit as claimed in claim 17, wherein the secondary-side switching circuit generates the synchronous signal and pulse signal in response to a power-on signal, and the switching-transistors and the power switch set of the synchronous switch are turned off once the power-on signal is disabled.

19. The synchronous regulation circuit as claimed in claim 15, wherein the primary-side switching circuit further generates an enable signal in response to the synchronous signal, and the enable signal shows output load conditions of the power converter.

20. The synchronous regulation circuit as claimed in claim 15, wherein the power switch set is formed by a first power switch and a second power switch connected in series, the first power switch has a first diode connected in parallel, and the second power switch has a second diode connected in parallel.

21. The synchronous regulation power converter as claimed in claim 15, wherein the control circuit generates a first-control signal and a second-control signal, the first-control signal is coupled to control the first power switch, the second-control signal is coupled to control the second power switch, and the first power switch is turned on once the first diode is conducted.

22. The synchronous regulation circuit as claimed in claim 15, further comprising a flyback switch coupled to the synchronous switch, wherein the flyback switch is turned on in response to the off of the power switch; the turn-on period of flyback switch is correlated to the turn-on period of the power switch.

23. The synchronous regulation circuit as claimed in claim 15, wherein the secondary-side switching circuit comprises:
a programming device generating a program signal; and
a linear-predict circuit generating a drive signal in response to the program signal and the pulse signal, wherein the drive signal is coupled to control the flyback switch.

24. The synchronous regulation circuit as claimed in claim 15, wherein the secondary-side switching circuit further comprises:
an oscillation circuit generating oscillation signals;
a pulse width modulation circuit generating a pulse width modulation signal in response to the oscillation signals;
an error amplifier coupled to the output of the power converter to receive the feedback signal and generate an error signal;
a soft-start circuit generating a soft-start signal in response to a reset signal;
a ramp circuit generating a ramp signal in response to the pulse width modulation signal;
a comparator generating a clear signal to disable the pulse width modulation signal in response to the error signal and the ramp signal; and
a pulse signal generator generating the pulse signal in accordance with the pulse width modulation signal, wherein oscillation signals are coupled to generate the synchronous signal, the synchronous signal is a differential signal, the polarity of the synchronous signal determines the on/off state of switching transistors, the pulse width modulation signal is enabled in response to oscillation signals, the pulse width modulation signal is disabled in response to oscillation signals and the clear signal, the soft-start signal is coupled to control the pulse width of the pulse width modulation signal, the pulse signal is a differential signal, and the polarity of the pulse signal determines the on/off state of the power switch.

25. The synchronous regulation circuit as claimed in claim 24, wherein the secondary-side switching circuit further comprises a power management circuit coupled to receive the error signal for generating a light-load signal to burst the switching signal during a light load of the power converter.

26. The synchronous regulation circuit as claimed in claim 15, wherein the control circuit comprises a latch circuit coupled to receive the pulse signal for set or reset the latch circuit, and the latch circuit is coupled to turn on or off the power switch.

27. A synchronous regulation method, comprising:
generating a synchronous signal and a pulse signal in response to a feedback signal and an oscillation signal;
transferring the synchronous signal through an isolation barrier;
generating a switching signal to switch a transformer in response to the synchronous signal;
transferring the pulse signal to a latch;
setting or resetting the latch in response to the polarity of the pulse signal; and
turning on or off a power switch set in accordance with the status of the latch, wherein the feedback signal is correlated to the output of the power converter, and the power switch set is coupled between the transformer and the output of the power converter for rectifying and the regulation.

28. The method as claimed in claim 27, further comprising:
receiving a program signal; and
generating a drive signal to turn on or off a flyback switch in response to the program signal and the pulse signal, wherein the flyback switch is coupled to the power switch set and the output of the power converter.

29. The method as claimed in claim 27, further comprising:
generating an error signal in accordance with the feedback signal; and
generating a light-load signal by comparing the error signal with a threshold signal, wherein the light-load signal is coupled to turn off the switching signal and the power switch.

30. The method as claimed in claim 27, wherein a maximum turn-on period of the power switch set is limited by a maximum-on-time circuit.

* * * * *